United States Patent
Schaumont et al.

(10) Patent No.: US 6,584,147 B1
(45) Date of Patent: Jun. 24, 2003

(54) HIGH SPEED MODEM FOR A COMMUNICATION NETWORK

(75) Inventors: Patrick Schaumont, Wijgmaal (BE); Serge Vernalde, Heverlee (BE); Marc Engels, Wijgmaal (BE); Willy Petrus Elisa Trog, Zwijndrecht (BE); Karel Stefaan Martha Maria De Meyer, Brasschaat (BE); Bart Jozef Maria De Ceulaer, Noorderwijk (BE); Marc Suzanne Paul Moonen, Heverlee (BE); Piet Michel Albert Vandaele, Merkem (BE)

(73) Assignee: IMEC, Leuven (BE)

( * ) Notice: Subject to any disclaimer, the term of this patent is extended or adjusted under 35 U.S.C. 154(b) by 0 days.

(21) Appl. No.: 09/100,304

(22) Filed: Jun. 19, 1998

(30) Foreign Application Priority Data

| May 23, 1997 | (EP) | ............................................. | 97870093 |
| Jun. 23, 1997 | (EP) | ............................................. | 97110208 |
| Dec. 16, 1997 | (EP) | ............................................. | 97870201 |

(51) Int. Cl.⁷ .............................................. H04B 1/38
(52) U.S. Cl. ..................................................... 375/220
(58) Field of Search ................................. 375/219, 222, 375/229, 234, 295, 316, 232, 220, 260; 370/203, 473, 210, 476, 342; 455/73, 551, 557; 708/323, 400, 403, 404

(56) References Cited

U.S. PATENT DOCUMENTS

| 5,495,203 A | | 2/1996 | Harp et al. | |
| 5,692,011 A | * | 11/1997 | Nobakht et al. | ............. 375/233 |
| 5,710,797 A | * | 1/1998 | Segal et al. | .................. 375/346 |
| 5,818,825 A | * | 10/1998 | Corrigan et al. | ............. 370/329 |
| 5,886,989 A | * | 3/1999 | Evans et al. | ................. 370/347 |
| 5,898,929 A | * | 4/1999 | Haartsen | ...................... 455/462 |
| 5,914,982 A | * | 6/1999 | Bjarnason et al. | ........... 375/222 |
| 5,920,840 A | * | 7/1999 | Satyamurti et al. | ......... 704/267 |
| 5,991,308 A | * | 11/1999 | FuhRmann et al. | .......... 370/474 |
| 6,011,813 A | * | 1/2000 | Ghosh | ......................... 375/233 |
| 6,028,860 A | * | 2/2000 | Laubach et al. | ............. 370/395 |
| 6,075,972 A | * | 6/2000 | Laubach et al. | .............. 455/5.1 |
| 6,084,865 A | * | 7/2000 | Dent | ............................ 370/321 |
| 6,144,711 A | * | 11/2000 | Raleigh et al. | .............. 375/347 |
| 6,246,716 B1 | * | 6/2001 | Schneider | .................... 375/220 |

FOREIGN PATENT DOCUMENTS

| EP | 204308 | 12/1986 |
| EP | 615347 | 9/1994 |

OTHER PUBLICATIONS

Clewer, R., "Design Considerations for Intelsat V. TDMA Modems", *IEEE*, 1982, pp. 6.1–6.5.

\* cited by examiner

*Primary Examiner*—Emmanuel Bayard
(74) *Attorney, Agent, or Firm*—Knobbe Martens Olson & Bear, LLP

(57) ABSTRACT

A receiver is disclosed at the head-end or a centralizing unit side in a communications system or network for signals in the upstream direction which is the direction from user to head-end or a centralizing unit that is linked to a number of users, the number being equal to or larger than one. The receiver is suited for the reception of burst mode signals. The receiver performs a channel estimation on a per-burst basis in real time or essentially immediate. The channel estimation is necessary to do successful data detection of modulated data. The receiver of the invention performs the channel estimation and data detection in one compact all-digital mechanism that has no tuning parts. The reception method works in an aspect according to the principle of a matched filter receiver, but stores no local copy of the required matched waveform. Rather, a copy of the matched waveform is included in the preamble of the signals.

54 Claims, 28 Drawing Sheets

HIGH SPEED MODEM FOR A COMMUNICATION NETWORK

FIELD OF THE INVENTION

The present invention relates to a receiver at the head-end or side in a communications system or network. More specifically, the invention relates to a receiver for signals in the upstream direction which is the direction from user to head-end or a centralizing unit that is linked to a number of users, the number being equal to or larger than one.

BACKGROUND OF THE INVENTION

The technology area of communications systems is subject to a vast engineering effort in order to allow for an always increasing number of applications.

Currently, the public access network for television (CATV) is being prepared for bi-directional communication. The goal of upgrading the CATV network is to provide bi-directional communication of digital data at speeds well beyond that of traditional data communication over telephone lines. This way, CATV data communication allows new types of applications such as video-on-demand and fast Internet access. It also provides an alternative to existing telephone services. In that case, the analog voice data is digitized and transmitted as a collection of data packets. For CATV communications, one defines the downstream direction, going from the broadcasting head-end side to the user side, and the upstream direction, going from the user side to the broad-casting head-end side. These definitions of upstream and downstream direction in the sequel are adopted also for any communications system or communications network. The upstream direction is defined as going from a user side or a subscriber residence to a central office or head-end or a centralizing unit that is linked to a number of users, the number being larger than one.

The communication process between the end-user and head-end is typically organized as a number of hierarchical subprocesses, each running at a different level of abstraction. This hierarchy is needed to express the access of the communications network between communicating parties in an efficient way. This invention is concerned with the communication subprocess on the lowest hierarchical layer, i.e., the physical layer.

The goal of communications on the physical layer is:
  to provide a reliable means of data communication by applying methods of data modulation and demodulation, and
  to transfer this reliable communication method towards the higher layers. This is done by means of an interface and a protocol.

The topology of the physical layer a typical public access network for television is shown in FIG. 1. Both the head-end side and user side have a transmitter and receiver to make bi-directional communication possible. The network has a tree-like topology, and consists of both active elements (bi-directional amplifiers) and passive elements (cable, splitters and taps). For each head-end transmitter/receiver pair, many user-end transmitter/receiver pairs may exist. Typically, 400 users can be served through 1 head-end. The up- and downstream communications path run over a single electrical path and are differentiated through frequency multiplexing, as shown in FIG. 2.

U.S. Pat. Nos. 3,962,637 and 5,127,051 describe improved modems for high frequency data transmission. In particular, U.S. Pat. No. 5,127,051 discloses a modem system that can adapt to fast channel variations by rapidly deriving accurate channel estimate without excessive storage of data overhead. Accordingly, the data are transmitted in a frame carrying at least two identical data sequences. This approach, however, has as a disadvantage a major overhead for static type of channel and therefore has a slow performance for these channel types. The publication "CATV Return Path Characterization for Reliable Communications" by C. A. Eldering, IEEE Communications Magazine, August 1995 addresses the problem of reliable solutions for bi-directional communication. In said publication, an emphasis is given to the key problem of the understanding of the communication channel characteristics in the upstream direction. One of the problems in upstream communication is as follows. As we move from the user to the head-end, the physical transmission medium (the cable or the channel) is shared by an increasing amount of users. Therefore, users will share the medium in the upstream direction by means of an appropriate multi-access protocol. This invention is concerned with the time-division multi-access protocol which uses burst-mode signals. In this protocol, each user gets in turn connection to the head-end during a fixed time-slot. The start and end of the time-slot is decided at the head end by allocation algorithms running in the higher hierarchical communication layers. A discussion of these allocation algorithms is out of the scope of this patent application since it is concerned with the transport of data on the physical layer only.

The key problems to solve in order to establish a reliable upstream communication between the user and the head-end are the following:

1. As the signals emitted at the user side propagate through the upstream channel, they are attenuated and delayed. This attenuation and delay is different for each user, since each user is connected at a different position in the tree network as seen from the head-end. Therefore the head-end must estimate these modulation distortions on a per-burst basis. It must also do this as fast as possible, since during estimation time, no useful data can be transmitted.

2. Besides attenuation and delay, the signals also suffer from group delay distortion. Group delay distortion is caused by the non-linear phase characteristics of the (mainly active) components located in the up-stream channel. The effect of group delay distortion is that the time-domain shape of the distorted signal is changed. The distortion is a linear effect, which means that it can be removed by passing the received signal through a proper filter before detecting it. The required shape of this filter is dependent on the amount and type of group delay distortion, and is again different for each user. Therefore, the head-end receiver must estimate the coefficients of this filter on a per burst basis. Failure to do so causes an effect at the head-end receiver side called inter-symbol-interference (ISI). ISI degrades the quality of the data detection process, and therefore should be avoided.

The process of estimating attenuation, delay and group delay distortion is jointly called channel estimation.

3. The upstream communications CATV path is also susceptible of noise influences. These can be caused by electrical appliances or spurious emissions of radio-band users (mobile communication, amateur, CB, . . . ), and other, unknown sources. Since the actual time-domain shape of noise is unknown, it cannot be removed at the receiver. It will therefore also degrade data detection performance of the receiver. The transmission can however be protected against noise influences by applying a proper encoding of the data. The encoding increases the redundancy of the transmitted data pattern. At the receiver side, the removal of this redundancy can then be used to identify locations of errors in the received data pattern. Eventually, the redundancy can even be used to correct the errored values.

4. All estimation processes active in the head-end receiver must proceed as fast as possible. During the estimation the actual delay, attenuation and group delay distortion is unknown and no data can be detected successfully. The signal transmitted by one user is of a bursty nature. Therefore, the shorter the estimation time, the more time will be left in the signal burst that can be used for the transmission of actual data.

In the remainder of this document, we will first summarize the key properties of the invention, which is a digital receiver for these burst mode signals. Next, we will give a detailed description of the receiver and its operation.

SUMMARY OF THE INVENTION

The present invention relates to a receiver at the head-end or a centralizing unit side in a communications system or network. The receiver is adapted for receiving signals in the upstream direction which is the direction from user to head-end or a centralizing unit that is linked to a number of users, the number being equal to or larger than one. The present invention further relates to communication systems making use of burst-mode signals.

The present invention relates to a telecommunication system with means for upstream communication from a user to a head-end over a channel, said means for upstream communication including a receiver comprising a detect unit being configured in a feed-forward data driven architecture.

Each algorithm is executed by a dedicated digital hardware machine, comprising a local controller and a data path. The data path executes the data processing operations inside the algorithm, while the local controller performs operation sequencing, and algorithm synchronization.

In an aspect of the present invention, said detect unit is adapted for receiving a burst-mode signal, said burst-mode signal having a preamble with at least one training portion at the beginning of the burst followed by at least one timing alignment portion.

Said signal further can comprise a user message.

In another aspect of the invention, the detect unit of the system can comprise a block for extracting information on at least one transmission characteristic of said burst-mode signal in said channel, said information being obtained as the coefficients of a fractionally spaced feed-forward equalizer in said block.

The receiver can further comprise a timing block wherein said alignment portion is processed, said alignment portion providing the transition from said training portion to said user message as the downsampling phase of said block.

Yet the receiver can comprise a detection block for detecting said signal and adjusting the power level of said signal to a predetermined power level; and a filter block with programmable coefficients for filtering said user message.

Said coefficients can be extracted from said preamble in real-time.

Yet in a further aspect of the invention, the receiver has a feed-forward architecture that is configured as a chain of subsequent components, said signal being consecutively passed and without feedback through said chain, the chain comprising components having a finite state machine and a data path, the signal being passed through the data paths, the finite state machines running a control program, said components behaving differently when a burst signal is received or not.

Yet the present invention is also related to, in a communication system, a method for transmitting a signal, said method comprising the steps of:

transforming said signal into a first sequence of digital data;

prepending a predetermined sequence of data to said first sequence of data, said predetermined sequence having a training portion at the beginning of the predetermined sequence followed by a timing alignment portion, the sequence of said predetermined sequence and said first sequence being a resulting data sequence; and modulating said resulting data sequence to a predetermined format for transmission.

The method can further comprise the step of receiving said signal in a receiver with an equalizer block with programmable coefficients, said step comprising the substeps of:

fixing said coefficients while analyzing said training portion of said predetermined sequence of first data; and detecting said timing alignment portion as the transition to said first sequence of data; and thereafter performing data filtering on said first sequence of data.

The method can be executed in real-time.

In a further aspect of the invention, a method of operating an adaptive modem for analyzing signals being transmitted over a communications channel is disclosed. Said signals are being sent in at least one burst comprising a preamble and a user message, said method comprise the steps of:

receiving the transmitted signals;

generating a plurality of coefficients for a downsampling feed forward adaptive equalizer from a training sequence in said preamble of said burst;

adapting said downsampling feed forward adaptive equalizer to said communications channel.

According to the method of the invention, the signals are analyzed on a burst-by-burst base and in real-time.

The receiver of the invention is suited for the reception of burst-mode signals. The receiver performs a channel estimation on a per-burst basis in real time or essentially immediate. The channel estimation is necessary to do successful data detection of modulated data.

Current state of the art modems do not perform per-burst channel estimation and/or group delay distortion estimation, but rather assume a fixed channel from which the data can be detected by means of a fixed data filter.

The receiver of the invention performs the channel estimation and data detection in one compact all-digital mechanism that has no tuning parts. The reception method works in an aspect according to the principle of a matched filter receiver, but stores no local copy of the required matched waveform. Rather, a copy of the matched waveform is included in the preamble of the signals.

The burst-mode signals that are received comprise two parts: A preamble and a payload. The preamble has among other functions, the function to perform the channel estimation and synchronize the demodulation loops, while the payload contains the actual data to transmit, including error correcting codes. The preamble comprises at least one training portion followed by a timing alignment portion. In case several training portions are included in the preamble, the method of the invention can be implemented as an averaging algorithm, averaging the results obtained from the different training portions.

The overhead of the burst-mode signal is therefore primarily located in the preamble, since it contains no user data. The present invention contains a very short and fixed preamble.

The channel estimation method allows compensation of an arbitrary amount of group delay distortion through a very simple extension of the burst preamble.

The channel estimation is solely based on the burst preamble and is therefore very fast.

Due to the use of a training sequence, no differential encoding/decoding of the symbols is required, as is traditionally seen on QAM type modems.

The reception method allows reception of different pulse shapes with one single implementation. When the pulse shapes are of the so-called root-raised-cosine (RRC) family (which is the most commonly used shape in state-of-the art quadrature modulated modems), different RRC roll-off factors are supported by one and the same architecture. Other pulse shapes are possible as long as they have the ISI-free property. This property is discussed in the sequel.

In general, the reception method implies that one and the same receiver can be used to receive different standards (self-adapting).

It uses a feed-forward architecture. For a burst-mode receiver, this is an important property. A feed-forward architecture is self-controlled and pipelineable. Due to the absence of feedback loops, system stability is independent of the delay of individual components.

The receiver and method of the invention furthermore in other aspects allow for an immediate channel estimation and allow to compensate for substantially any group delay distortion.

The receiver and method of the invention in yet another aspect allow for combined timing and phase estimation. The receiver of the invention also in an aspect is adapted for receiving signals of transmitters having different characteristics as being for instance the products of different companies or having different roll-off factors such as determined in the DAVIC standard or the IEEE standard or the MCNS standard.

DETAILED DESCRIPTION OF THE PREFERRED EMBODIMENT

For the purpose of teaching of the invention, several embodiments of the invention will be described in detail. This detailed description in no way however can be used to limit the present invention, the scope of the invention being limited only by the terms of the appended claims.

Relevant characteristics of the different embodiments of the invention are summarized below and comparison to current state-of-the art devices is given;

The data transmission proceeds in a rather narrow spectral band (approx. 5–65 MHz), compared the required data rate necessary to deliver broadband data services (1–10 Mbit/s).

Thanks to the real time channel estimation of the receiver of the invention, 16-ary QAM can be applied successfully.

The upstream data rate is 10 Mbps. However, since a single digital processor is used for data detection, varying the symbol rate is merely a matter of varying the clock frequency by which the digital processor is clocked. Furthermore, the data to transmit is quadrature demodulated to obtain the highest spectral density. This spectral density optimization allows efficient use of the upstream spectral bandwidth. QPSK (quadrature phase-shift keying) modulation is the technique of choice for current state of the art cable modems.

The invention presented supports QPSK, but also the spectrally more efficient 16-ary QAM (quadrature amplitude modulation). It is to be noted that the receiver of the invention can also be used for data speeds of 1 Mbit/s or lower and 100 Mbit/s or 1Gbit/s or higher.

The receiver delivers a symbol error rate of $5.10^{-5}$ at a carrier to noise power level of C/N=23 dB for QAM16. The theoretical optimal receiver for QAM16 offers the error rate at a carrier to noise power level of C/N=19.5 dB under the condition of white gaussian noise.

The receiver is a complete, digital single-chip receiver. Analog data is fed in by means of a fixed-clock analog-to-digital converter. Some numerical properties of the receiver architecture are summarized in table 1.

In the following descriptions, preferred embodiments of the invention are described. First, an overview of the general communication systems is given. Next, the receiver requirements are extracted out of a mathematical system model. Then, the receiver and its operation will be discussed according to preferred embodiments of the invention.

TABLE 1

Upstream Receiver Parameters of the embodiments of the invention described in the sequel

| Parameter | Value | Unity |
| --- | --- | --- |
| Symbol rate | 2.5 | Msym/s |
| Bit rate | 10 | Mbit/s (QAM16) |
| Modulation | QAM16 or QPSK | |
| Sample frequency | 10 | MHz |
| Multi-access Scheme | TDMA | |
| Preamble length | 17 | Symbols |

These values are only for orientation and sample system descriptions.

Preferred Embodiment of the Invention

Communications System Overview

Figure 1:
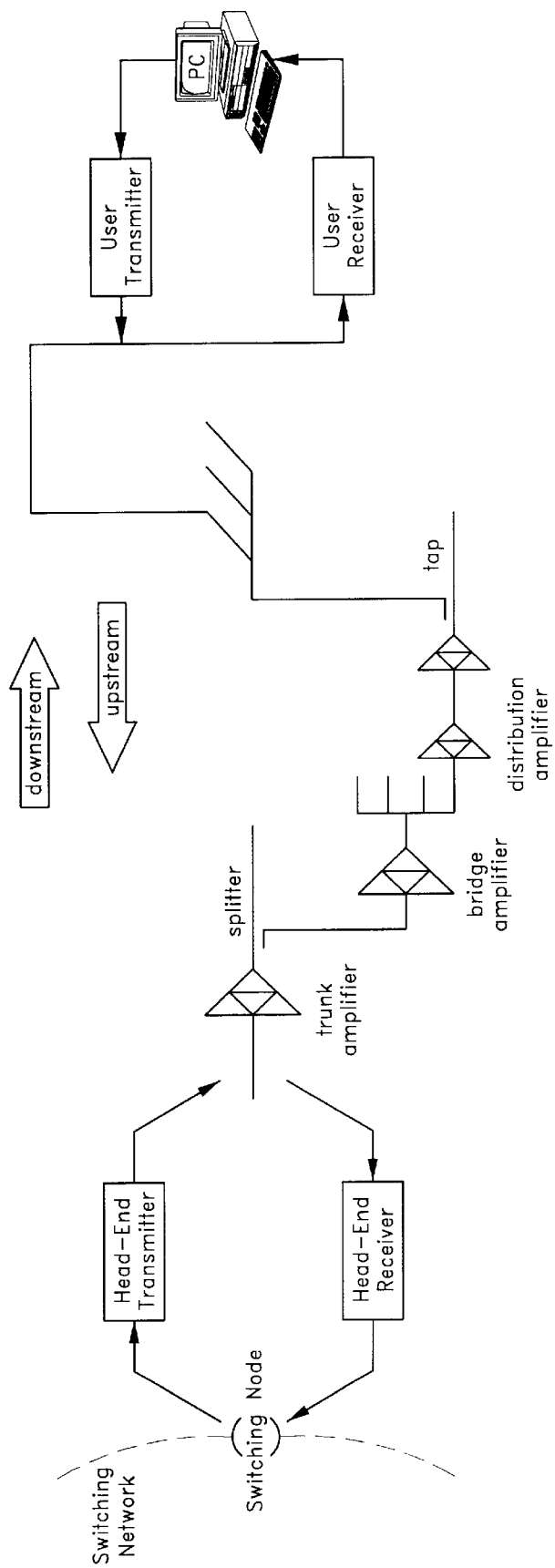
FIG. 1 shows an example of a CATV network for data communications.
Figure 2:
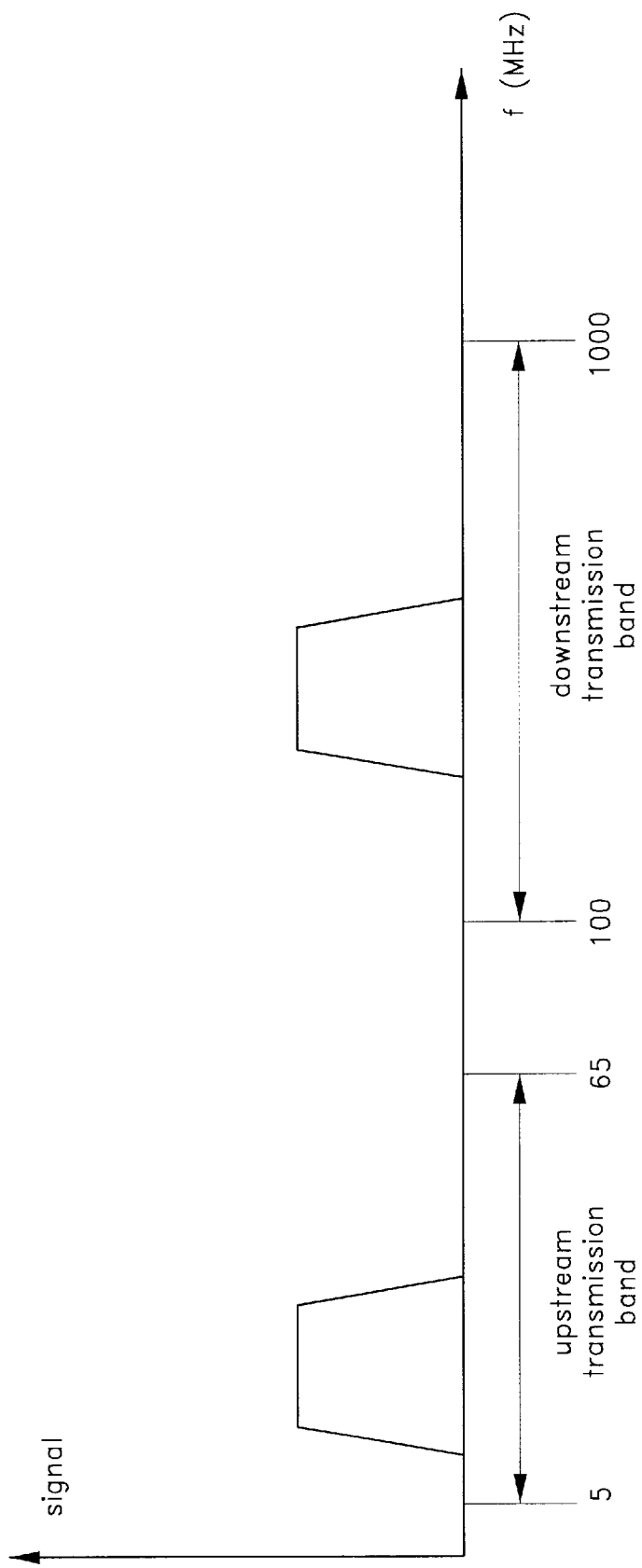
FIG. 2 shows an example of a method of Frequency Multiplexing to separate up- and downstream directions in the CATV network of FIG. 1.
Figure 3:
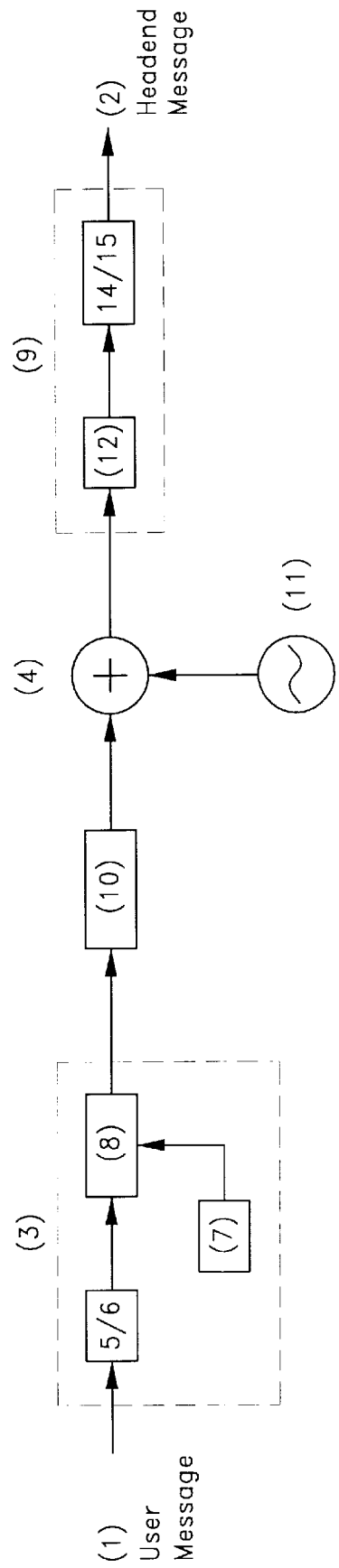
FIG. 3 shows an example of the Physical Layer of a communication system with means for upstream communications.

FIG. 3 shows an overview of an upstream CATV communication system that resides between the user (1) and the head-end (2). In this Figure, abstraction was made from all communication hierarchy above the physical layer.

The following parts are discerned:

A transmitter (3). The transmitter (3) reads a user message, and modulates this into the burst-format required for transmission over the upstream CATV channel (4).

The transmitter comprises a source coder (5), a channel coder (6), a preamble insertion mechanism (7), and a modulator (8). The source coder (5) translates the user message from a specified input format (analog voice data, images, . . . ) to a sequence of digital data. The channel coder (6) increases the redundancy present in the sequence to make the transmission more robust to noise influences on the channel. The preamble insertion unit (7) prepends a known sequence of data onto the burst data sequence. As indicated above, the purpose of the preamble is to speed up the channel estimation process in the receiver (9).

Finally the modulator (8) receives the resulting data sequence and converts it to a format suitable for upstream CATV transmission. This includes conversion of the discrete sequence to a continuous shape, and frequency translation of the modulated signal to the desired carrier frequency. For upstream CATV communication, this frequency is chosen between 5 and 65 MHz.

A channel model. Rather then representing the actual channel, a model is given of the distortions occurring in the channel. The delay, attenuation and group delay distortion all are linear distortions that can be modelled by means of a filter (10).

Figure 4:
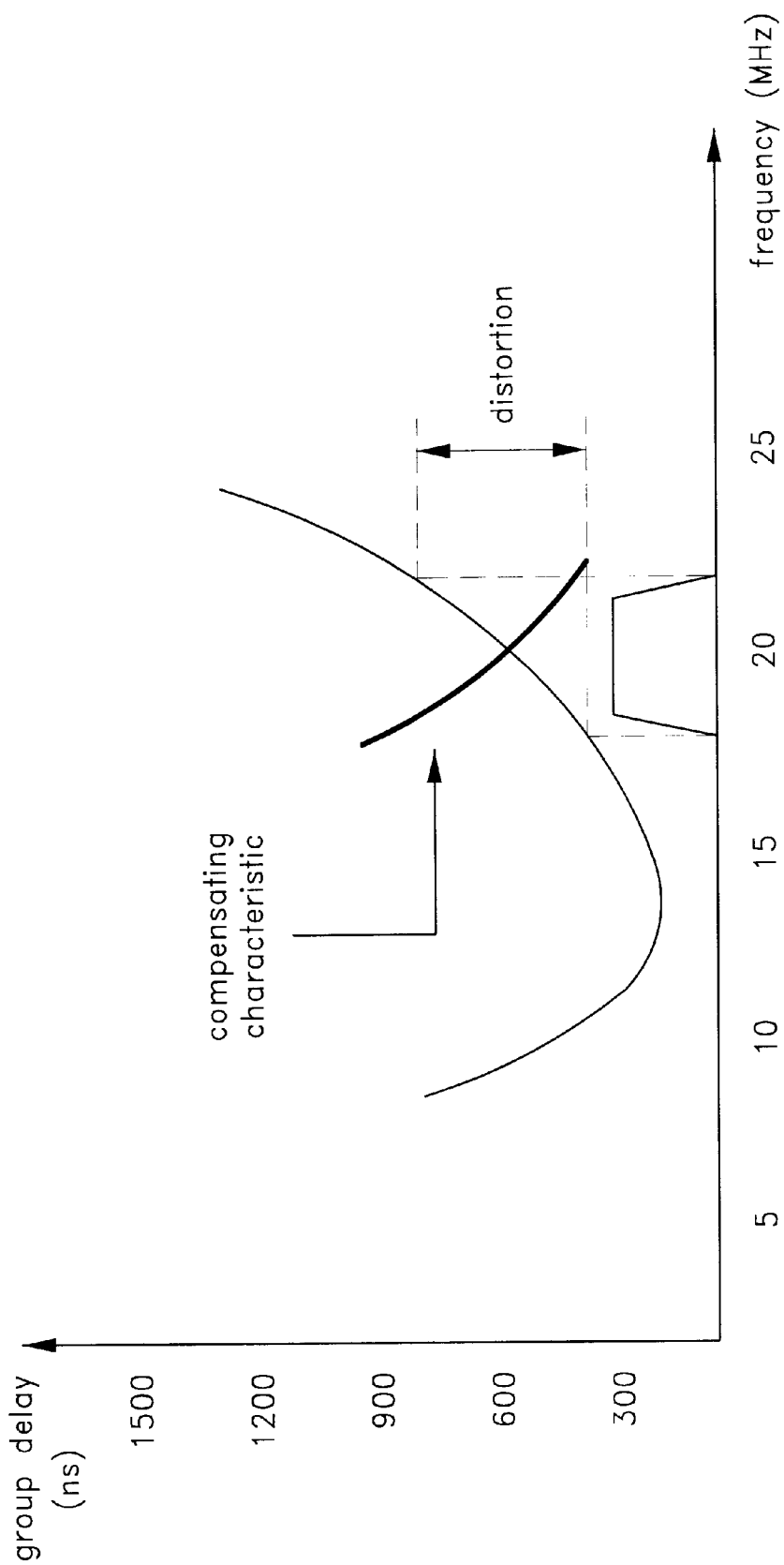
FIG. 4 shows the characteristics of Group delay on a typical communications channel.

As an example, the group delay as a function of frequency for the typical CATV upstream path is shown in FIG. 4.

The group delay value is defined as the differential of the channel phase characteristic with respect to frequency. It can be understood as the time difference it takes for signal components at a different frequency to travel over the channel.

The modulated signal, which extends over a certain bandwidth, gives rise to group delay distortion. The distortion is merely an effect of the non-linear phase characteristic of the channel (4). In this case, a filter (10) is provided in the system model which exhibits the same phase characteristic as the channel. The receiver (9) then introduces an inverse phase distortion according to the compensating characteristic shown in the FIG. 4.

The noise is modelled by introducing a random signal (11) with unknown shape but known probability distribution. The distribution varies with the type of disturbance that has to be modelled. For a large number of unknown disturbances, a gaussian probability is used. The influence of the noise on the signal is expressed as the relative power level of the desired signal to the noise signal. This is also called signal-to-noise ratio.

A receiver (9). The receiver (9) accepts the burst signal transmitted by the transmitter (3), performs channel estimation, and detects the data symbols that were inserted in the transmitter modulator (8). All of these occur in the Detect block (12). After detection, channel decoder (14) performs error correction using the redundancy introduced earlier, while source decoder (15) translates a discrete sequence back to the desired source format.

Derivation of Receiver Requirements

In this section, the requirements for the Detect block (12) of the receiver (9).

Figure 5:
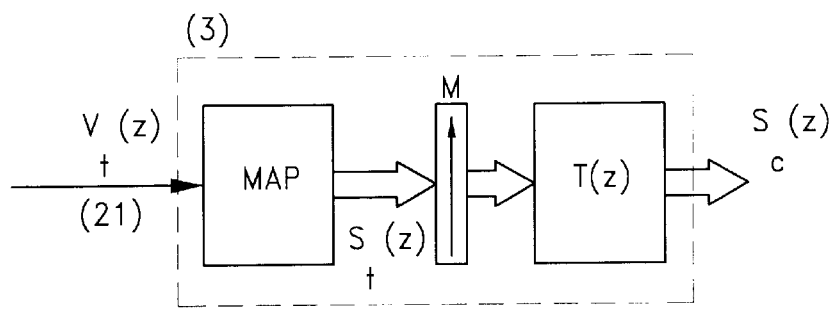
FIG. 5 shows a Mathematical model of a preferred embodiment of a communication system according to the present invention.
Figure 5:
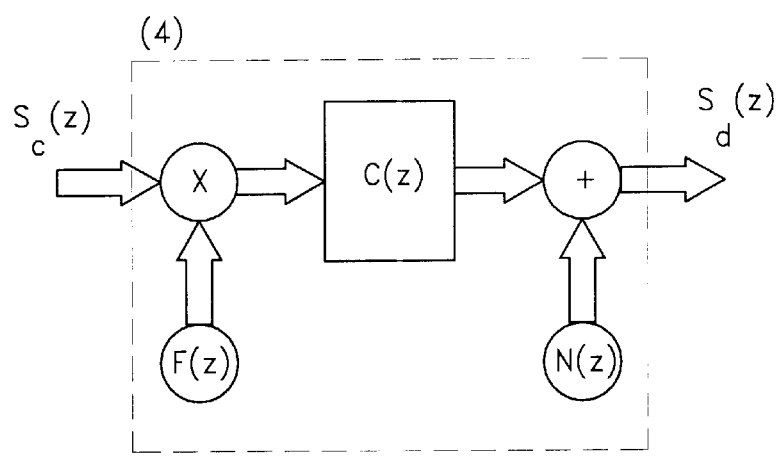
Figure 5:
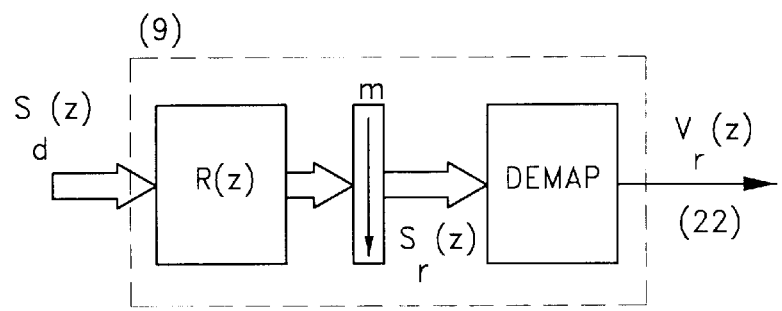

FIG. 5 shows a transmitter (3), a channel (4) model and a receiver (9) are mathematically formulated. For the transmitter and receiver, the source coding and channel coding have been omitted, and only the inner parts are shown. The model is formulated by means of a Z-transform. It is also shown in baseband-equivalent format, which means that the frequency translations have been omitted (the up-conversion at the transmitter side and the down-conversion at the receiver side). This requires the channel model to be expressed in baseband equivalent format too.

In order to represent a quadrature modulated signal in baseband equivalent format, complex values are needed. The fat arrows in the figure represent complex signals, while the thin ones (21) (22) represent real signals.

Figure 6:
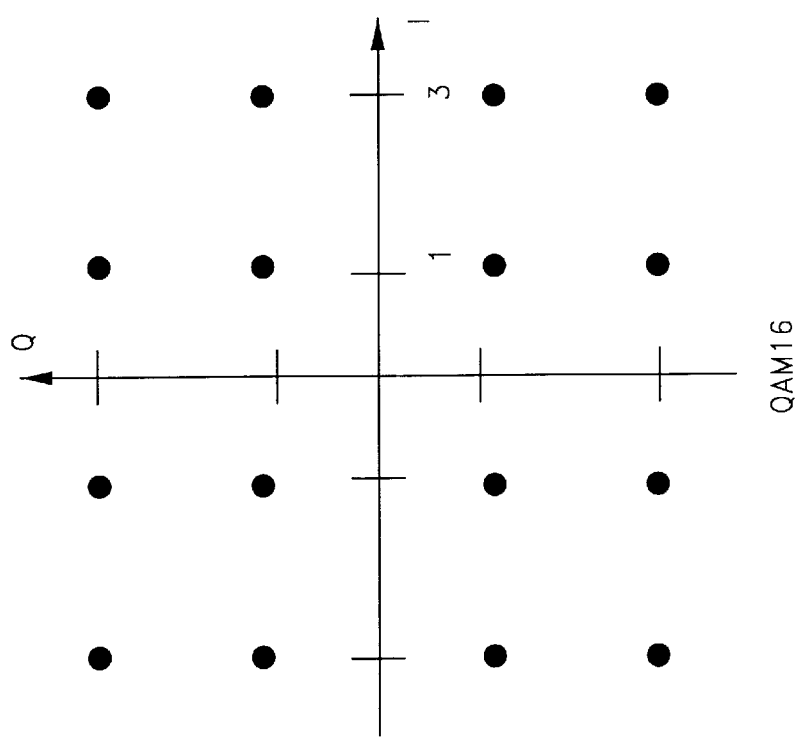
FIG. 6 shows an example of a QPSK and QAM16 constellation in an aspect of the invention.
Figure 6:
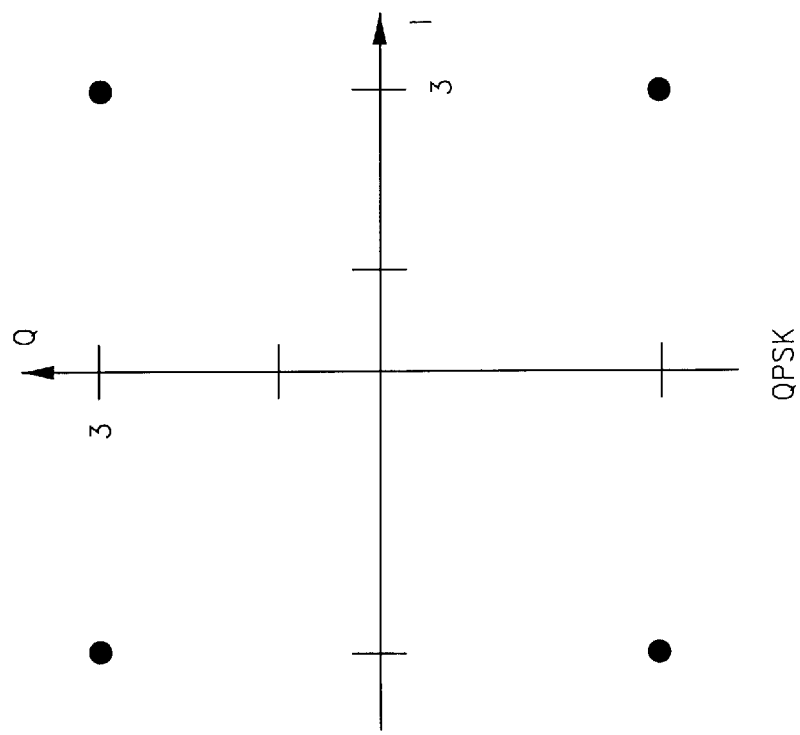

The sequence of operations performed in this system is as follows. The transmitter (3) reads in a data sequence $V_t(z)$ and maps this to a QPSK or QAM-16 symbol sequence $S_t(z)$. A QPSK symbol can take on 4 different (complex) values, while a QAM16 can take on 16. Since these signals are complex values, it is easy to represent them in a two-dimensional plane with the real component along the X-axis and the imaginary component along the Y-axis. Mapping the 4 (QPSK) or 16 (QAM16) different symbol values onto this plane, we arrive at the constellation plots, as shown in FIG. 6. The real component is indicated with the symbol I (for in-phase), while the imaginary component is shown with symbol Q (for quadrature).

After mapping of the data sequence $V_t(z)$, the symbol sequence $S_t(z)$ is obtained. The symbol sequence $S_t(z)$ is then up-sampled by a factor m and fed into the pulse shaping filter $T(z)$. The equivalent baseband transmitted signal thus is given by:

$$S_c(z)=S_t(z^m)T(z) \quad (1)$$

Figure 7:
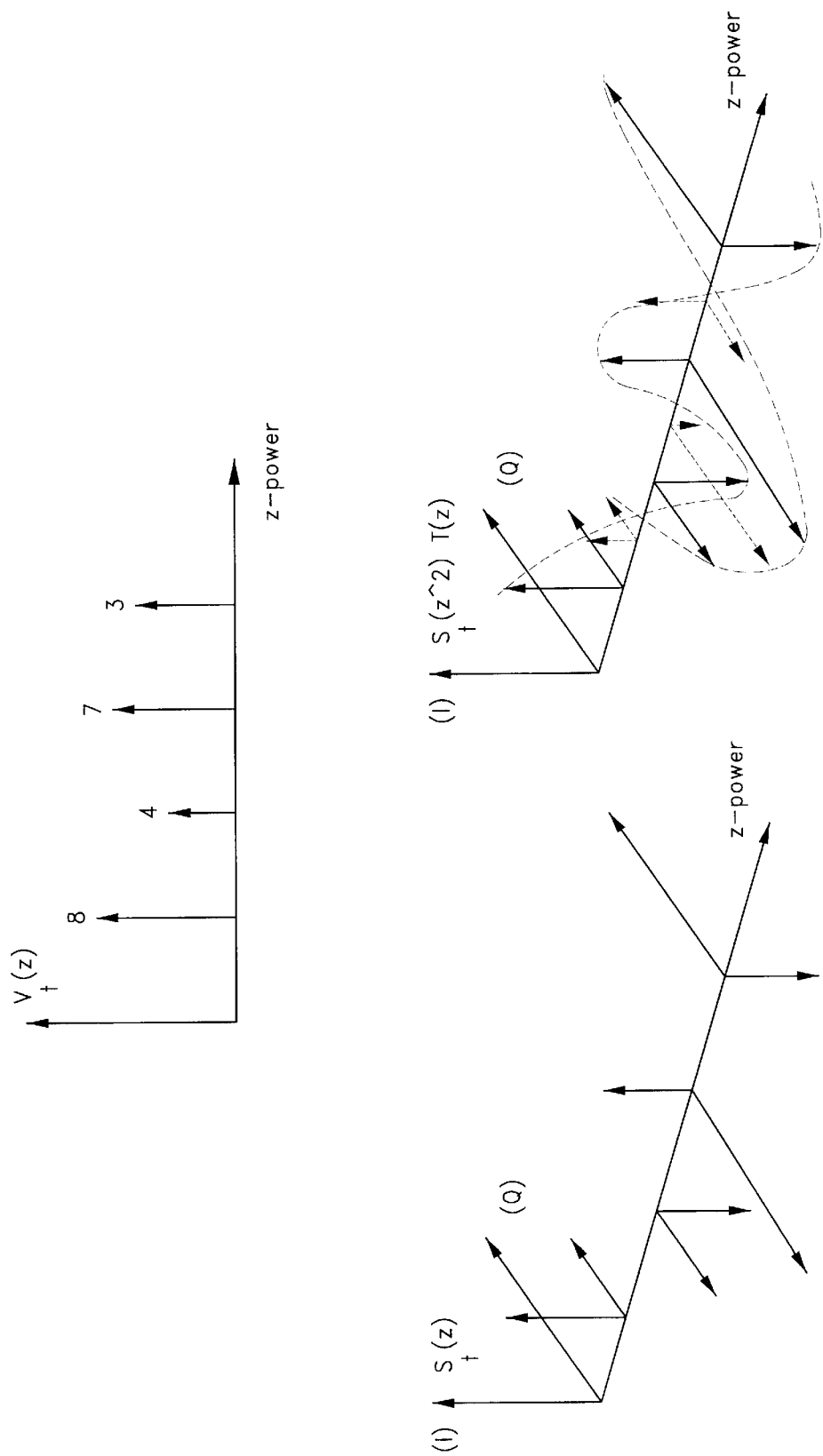
FIG. 7 shows a graphical representation of the modulation process for m=2.

A graphical representation of this modulation process is shown in FIG. 7 for the case of m=2. In this situation the digital modulator is said to operate at two samples per symbol.

In the channel (4) model, the following effects are successively applied on the signal.

1. A frequency and/or phase error can be introduced by means of a carrier signal F(z) and a mixer. The frequency/phase errors are caused by a mismatch of the frequency up-conversion in the transmitter (3) and the frequency down-conversion in the receiver (9). At the receiver, the observed signal then is misaligned in terms of carrier frequency and phase. The signal F(z) represents this misalignment.

For a constant phase error Φ

$$F(z)=Z(e^{-j\cdot\Phi}) \quad (2)$$

and for a frequency error γ

$$F(z)=Z(e^{(j\cdot 2\cdot pi\cdot t\cdot\gamma)}) \quad (3)$$

with Z( ) denoting the Z-transform operation.

2. The delay, attenuation and group delay distortion is added inside a filter C(z).
3. Noise N(z) is added to the signal.

The resulting received signal $S_d(z)$ thus is given by:

$$S_d(z) = S_c\left(z \cdot e^{-j\cdot 2\pi \cdot \frac{\gamma}{f_s}}\right) \cdot C(z) + N(z) \quad (4)$$

$f_s$ is the sample frequency of the discrete system. In the receiver, this signal is filtered by R(z), and down-samples back to symbol rate. The resulting sequence $S_r(z)$ can then be inverse-mapped to the received data sequence $V_r(z)$.

We next derive the requirements for the filter R(z) for different types of distortion.

Receiver Requirements for an Ideal Channel

In case of an ideal channel, the incoming signal in the receiver (9) is given by:

$$S_d(z)=S_c(z)=S_t(z^m)T(z) \quad (5)$$

After filtering by R(z) we find:

$$S_r(z^m)=S_t(z^m)T(z)R(z) \quad (6)$$

For correct operation, T(z)R(z) is required to have the ISI-free property. The property of ISI-freeness requires two conditions to be fulfilled for T(z)R(z):

1. At m samples per symbol the T(z)R(z) is to be zero for all z-powers that are multiples of m.
2. For z-power zero, T(z)R(z) is also required to be one.

Provided this ISI-free condition is fulfilled, the downsampling operation yields:

$$i\ S_r(z)=S_t(z) \quad (7)$$

Thus, the transmitted symbol sequence is identical to the received symbol sequence.

Figure 8:
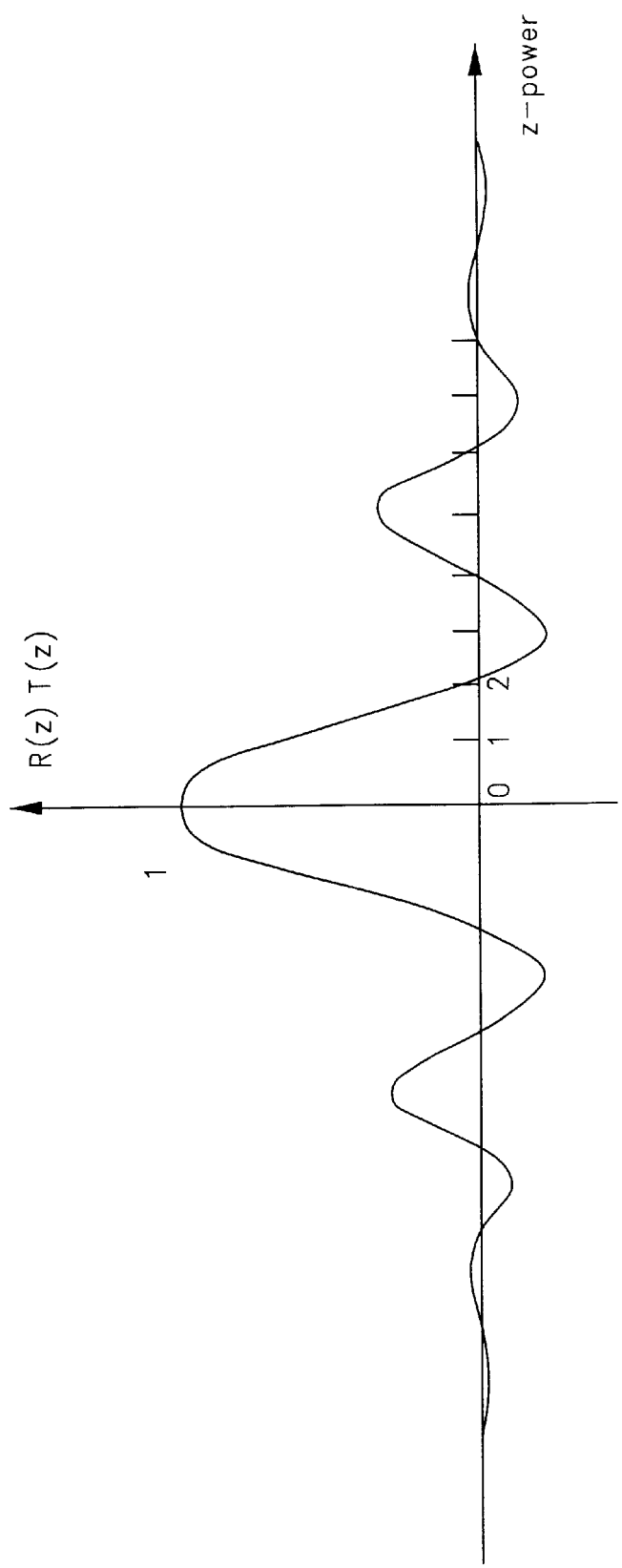
FIG. 8 shows an ISI-free pulse for m=2.

The property of ISI-freeness for R(z)T(z) is represented graphically in FIG. 8 for the case m=2.

In QPSK and QAM16 modulation, the ISI-free pulse shape T(z)R(z) is commonly a raised cosine pulse (RC).

Besides the ISI-free condition for T(z) and R(z), an additional condition is used to determine the individual contributions of both filters to the RC pulse. This condition is the matched filter requirement. It can be shown that a matched filter (a filter whose time domain impulse response is the reverse of a given filter impulse response) maximizes the signal-to-noise ratio of the data detection, and hence minimizes errors.

Therefore, ISI-free operation requires T(z) and R(z) to be equal and matched:

$$R(z)=T^*(z^{-1}) \quad (8)$$

The * notation indicates complex conjugation. This required pulse shape is called a square-root raised cosine. Because this is a symmetrical pulse, original and matched shapes are identical.

We summarize that a square-root raised cosine pulse is the required shape for both T(z) and R(z) in case a perfect channel is available.

The signal R(z) can be derived by observing the reception of a single data pulse, inserted in T(z). In that case, we do not need to store the R(z) coefficients, but rather they can be derived at run time.

Receiver Requirements in the Presence of Carrier Frequency and Phase Errors

The received signal in the presence of carrier frequency and phase errors is given by:

$$S_d(z) = S_c\left(z \cdot e^{-j\cdot 2\pi \cdot \frac{\gamma}{f_s}}\right) \cdot e^{-j\cdot\phi} \quad (9)$$

Substituting for the transmitted signal $S_t(z)$, and after filtering by the receiver filter R(z) we find:

$$S_d(z) = S_t\left(z^m \cdot e^{-j\cdot m\cdot 2\pi \cdot \frac{\gamma}{f_s}}\right) \cdot T\left(z \cdot e^{-j\cdot 2\pi \cdot \frac{\gamma}{f_s}}\right) \cdot R(z) \cdot e^{-j\cdot\phi} \quad (10)$$

ISI-free operation can be obtained if $$R(z) = T\left(\left(z \cdot e^{-j\cdot 2\pi \cdot \frac{\gamma}{f_s}}\right)^{-1}\right) \cdot e^{+j\cdot\phi} \quad (11)$$

So, $$R(z) = T\left(z^{-1} \cdot e^{j\cdot 2\pi \cdot \frac{\gamma}{f_s}}\right) \cdot e^{+j\cdot\phi} \quad (12)$$

We see that the required matched filter R(z) now is a root-raised cosine, but whose coefficients are rotated over a constant factor +φ, and a linearly increasing factor −γ.t.

In contemporary modems, the frequency and phase correction is often implemented in a separate block, and the special complex filter R(z) is not needed. The receiver presented here however will make use of this filter: by observing an incoming data pulse that has a certain carrier frequency and/or phase error, and taking the complex conjugate and time reverse of the observation, exactly the same formula is obtained.

Thus, the receiver filter R(z) can be constructed out of the observation of a single data pulse transmitted through the filter T(z). This will compensate the phase error and the immediate frequency error. A sustained frequency error will however require the use of an adaptive structure in the modem.

Receiver Requirements in the Presence of Delay and Attenuation Errors

The received signal in the presence of delay and attenuation errors is given by:

$$S_d(z) = K.Z(S_c(j\omega).e^{-j\omega n_1})).z^{-n_1} \quad (14)$$

where K is the attenuation factor of the system, $n_1$ is the integral time delay measured in samples of the discrete-time system, and $n_2$ is the fractional delay. Note that a frequency domain formulation was used to express the fractional time delay since there is no elegant way to write this in the Z-domain. We will call the time-shifted waveform $S'_c(z)$.

Substituting for the transmitted signal $S_t(z)$, and after filtering by the receiver filter R(z) we find:

$$S_d(z) = K.S'_t(z^m).T'(z).R(z).z^{-n_1} \quad (15)$$

where T'(z) and $S'_t(z^m)$ are time-shifted waveforms of the transmitter.

The detection problem can be simplified by the following two observations:

1. We can eliminate the $Z^{-n_1}$ factor provided we introduce in the receiver the ability to perform burst start-detection and alignment itself. The ISI-free operation now is obtained if R(z).T(z) is an ISI-free pulse.
2. The gain distortion factor K can be eliminated by including AGC (automatic gain control) circuitry into the receiver. This circuit will automatically apply a gain correction $K^{-1}$ onto the received signal. Assuming these two circuits are included in the receiver (before the filter R(z)), we now find $$S_d(z) = S'_t(z^m).T'(z).R(z) \quad (16)$$

The ISI-free condition now becomes:

$$R(z) = T'^*(z^{-1}) \quad (17)$$

If the transmitter filter T(z) is a root raised cosine filter, then we see that the receiver filter R(z) must be a time-shifted root raised cosine filter, with a time shift which is opposite to that of the transmitter shapes. By taking the observation of a transmitted data pulse and time-reversing it, we obtain the required matched filter.

In contemporary modems, the delay correction is often implemented in a separate block, and the time shifting of filter R(z) is not needed. The receiver of the present preferred embodiment however will make use of this filter.

Receiver Requirements in the Presence of Group Delay Distortion

Next, we seek the conditions for ISI-free operation in case of a general channel filter C(z).

In this case, the received signal is:

$$S_d(z) = S_c(z)C(z) = S_t(z^m)T(z)C(z)R(z) \quad (18)$$

and for ISI free operation we need $$R(z) = T^*(z^{-1}).C^{-1}(z) \quad (19)$$

This successful reception requires spectral inversion of the channel characteristic.

As before, $T^*(z^{-1})$ is a root-raised-cosine pulse.

In case of a channel with an all pass characteristic, the inverse of C(z) is derived by making use of the all-pass property of the channel. Writing down the frequency response of the all-pass channel C(z), we find:

$$C(j\omega) = |1|.e^{j.\phi(\omega)} \quad (20)$$

from which the inverse is found to be:

$$C^{-1}(j\omega) = |1|.e^{-j.\phi(\omega)} = C^*(j\omega) \quad (21)$$

We can also substitute $j\omega$ by $e^{j\omega}$, which is the definition of the Z-transform variable, and verify that $C^{-1}(z) = C^*(z^{-1})$.

ISI-free operation is obtained by observing an incoming data pulse T(z)C(z), and taking the complex-conjugate and time reverse of the observation, and forming the required matched filter.

Noise Susceptibility by Observing a Data Pulse

In the preceding derivations, it was found that the required matched filter always can be derived through the observation of a single transmitted data pulse. When the channel is corrupted by noise, the observation will also be degraded. As a result, the receiver filter coefficients in R(z) will contain the same noise power level as the noise power level on the channel.

The method of pulse observation therefore introduces twice the amount of noise over that of the theoretical method. In terms of modem performance, this yields a loss of 3 dB, when expressed in power levels. For the upstream CATV channel, which is a shielded environment, this degradation is acceptable due to the big advantages of receiver synchronization that are gained out of the method.

First Preferred Embodiment of the Invention

As a summary, the receiver has the following requirements:

1. To construct a matched filter for the distortions, it needs to be able to perform a spectral inversion of the received single data pulse. This data pulse defines essentially the content of the preamble.
2. It needs to be able to do signal burst alignment, which involves detection of the start (and end) of the burst signal. It needs to detect the single data pulse necessary to derive $T^*(z^{-1})C^*(z^{-1})$ and also the start of actual user data.
3. It needs to be able to estimate the gain of the signal.

A receiver constructed with these properties will be able to cope with the typical upstream CATV signal distortions (delay, attenuation, group delay distortion) for the case of quadrature modulation (such as QPSK or QAM16).

In the following, we will translate these requirements into a receiver architecture.

The requirements derived above lead to a generic receiver architecture and method of operation. In this section, this will be discussed. We include the definitions of signals to transmit, as well as the layout of the generic receiver for these type of signals.

Burst Format

Figure 9:
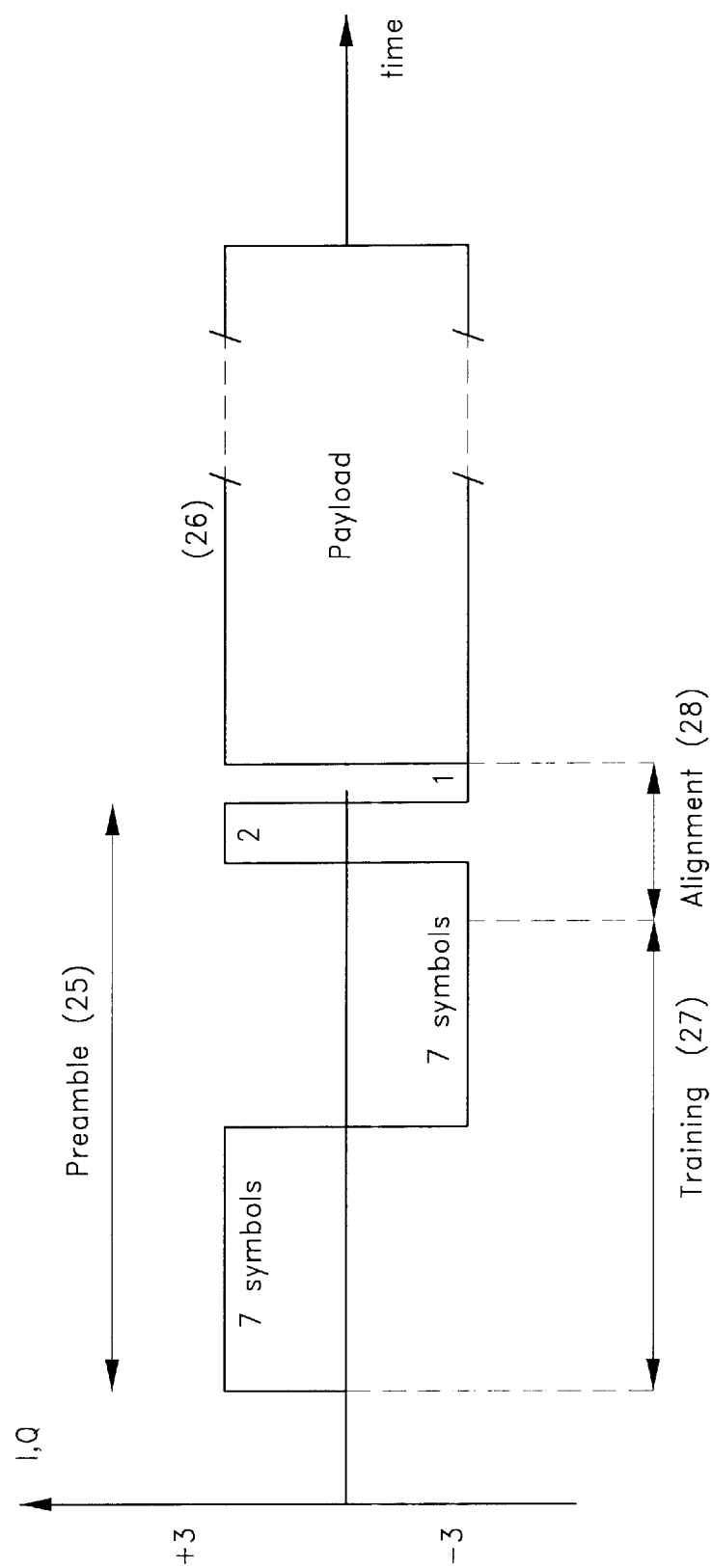
FIG. 9 shows the signal format for the communication system of the invention.

The burst format of the transmitted signal is presented in FIG. 9.

Two parts are discerned: a preamble (25) and a payload (26). Both were defined above. The preamble is identical on I and Q branches. During the payload, the I and Q branches of the modulation can differ.

The preamble has two parts: a training part (27) and an alignment part (28). The training is meant to derive estimates for gain, delay and group delay distortion and to derive the required receiver filter R(z). The alignment part is intended to perform burst alignment, and to detect the transition from preamble to payload. It is to be noted that in specific embodiments of the invention several training parts may precede the alignment part.

During the preamble (25), the maximum power level is transmitted. For any estimation derived from observing the preamble, this ensures that noise sensitivity is minimized. In the preferred embodiment, the preamble can contain 7 symbols of the upper right constellation symbol, followed by 7 symbols of the lower left constellation symbol.

Next 2 more upper right constellation symbols are sent followed by 1 lower left constellation symbol. This preamble is identical for both QPSK and QAM-16 type symbol constellations.

The preamble is also identical for all types of upstream CATV channels. Once past the preamble, the receiver is synchronized and data detection on the payload starts.

The length of the payload can either be an algorithm parameter or variable, corresponding to the fixed length mode, respectively the auto detect mode.

In the fixed length mode, a parameter determines the number of payload symbols. After the start of a burst is detected by the receiver, the received number of payload symbols is counted. After the parametrised amount of payload symbols is received, the reception algorithm terminates the burst reception.

In the auto detect mode, both the start and the end of the burst are detected by the reception algorithm autonomously. Hence, the payload may have a variable length.

Generic Receiver Architecture

Figure 10:
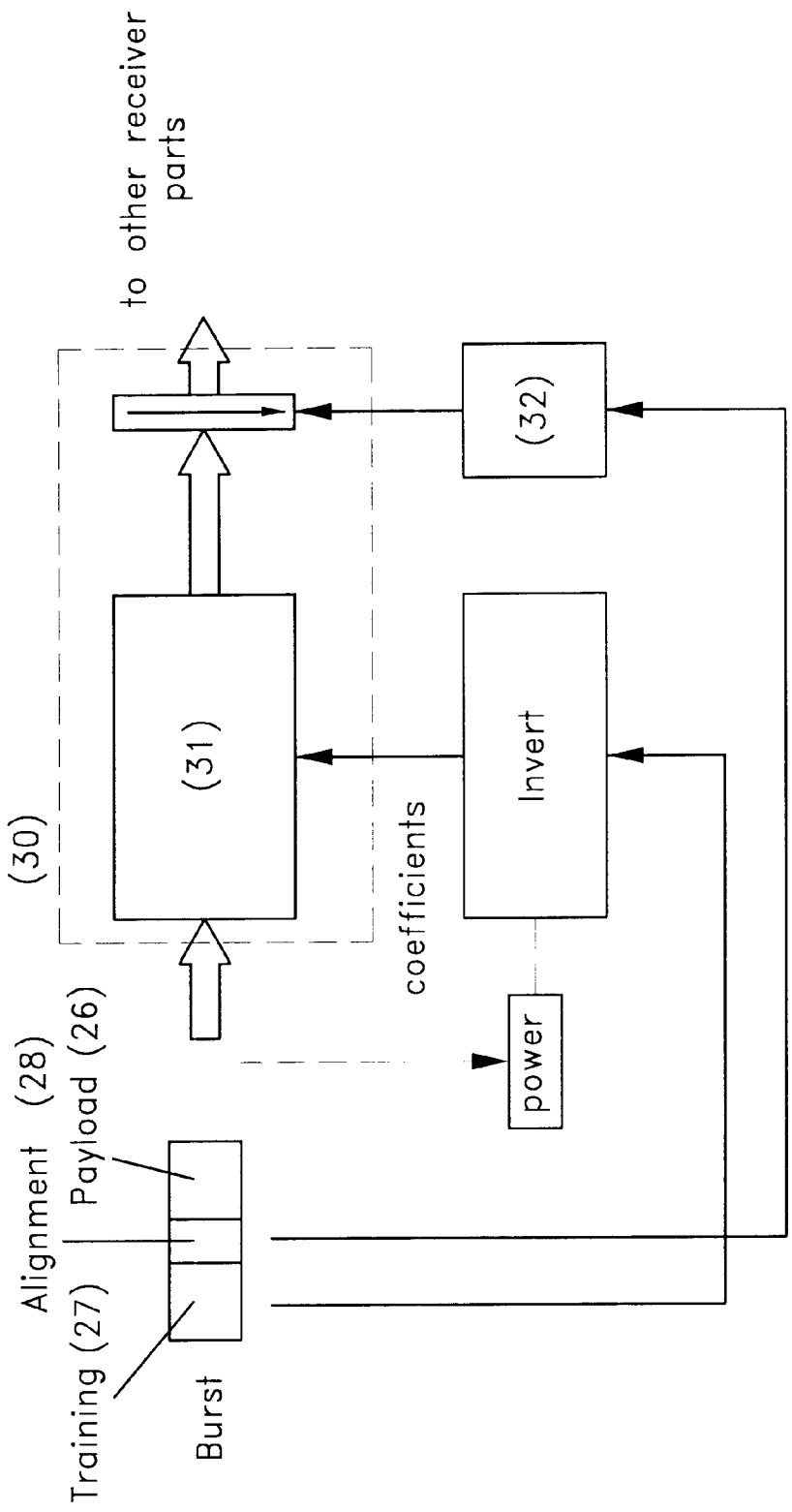
FIG. 10 shows an example of a Generic Receiver Architecture according to a preferred embodiment of the invention.

The burst signal as defined above can be processed by the generic receiver architecture shown in FIG. 10.

The leftmost side of the figure shows the burst signal comprising a training (27) and alignment part (28) (both in the preamble), and a payload part (26). This signal is fed to a DFFFSE (Downsampling Feed Forward Fractionally Spaced Equalizer) block (30) which has fractionally spaced feed forward equalizer (31) and a decision feedback equalizer which receives the output from the FSE (31). The training part of the burst signal is used to extract an estimate of the channel impulse response. This estimate is inverted in order to obtain the coefficients of a fractionally spaced feed-forward (FSE)(31) equalizer.

In order to extract the training part from the burst signal, a course alignment of the burst signal is completed. This is obtained by detecting the power level of the signal processed by the equalizer (31). The inversion required for various cases of channel distortion was discussed in the previous section.

Next, the precise burst alignment is done using the alignment part of the burst signal. By processing the alignment signal in the timing block, the required downsampling phase for the DFFFSE (30) is found.

The resulting signal obtained out of the DFFFSE (30) is free of linear channel distortions, including phase and amplitude distortions.

It can now be fed into further receiver parts. In the next section, a specific embodiment of the receiver (9) will be presented. More specifically, the DFSFFE will be refined to a MFE structure (matched filter equalizer). Also, all structures surrounding the DFSFFE will be shown, including both pre-processing parts and post-processing parts.

EXAMPLE

In this section, the detailed operation of the receiver according to a first embodiment of the invention is discussed. First the shape of the burst signals to transmit is defined. Next, an overall layout of the receiver will be given. Following this, the operation of each part is discussed.

Receiver Architecture

Figure 11:
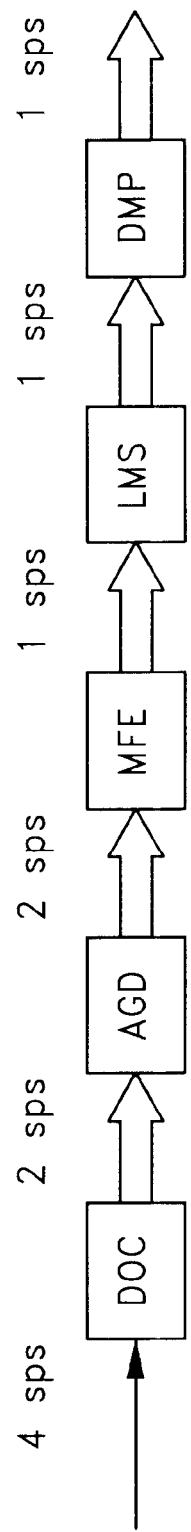
FIG. 11 shows an example of a Receiver Architecture according to an example of the invention.

The receiver layout is shown in FIG. 11. It comprises 5 subsequent processing stages, each of which have a tree letter acronym. The functionality of each block is briefly discussed below. Since these are digital processors in the present invention, the sample rate at the entry and exit of each block is also indicated. The sample frequency of the system is 10 MHz, while the symbol frequency is 2.5 MHz. For QAM16 modulation this yields 10 Mbit/s. We will use the symbol $f_p$ to denote the sample frequency. The sample frequency in the figure is indicated as a number of samples per symbol (sps).

1. The DOC block performs down-conversion of the received signal at pass-band and returns a baseband signal as a separate I and Q branch. The input sample rate is 4 samples per symbol, and the carrier frequency is assumed to be located at one fourth of the sample frequency. If the upstream communications carrier is located at a different carrier frequency then 2.5 MHz (10 MHz/4), then a pre-processing step must be implemented that will perform frequency translation from the desired carrier frequency to the 2.5 MHz carrier. The output of the DOC is down-sampled such that it returns a signal containing 2 samples per symbol.

2. The AGD block performs activity detection and automatic gain control. It monitors the incoming signal power level. When this power level rises above a pre-set threshold, the presence of a burst is assumed and activity is signalled. Also, the power level of the incoming signal is adjusted to that of a predefined one, which is the automatic gain control operation.

3. The MFE block performs data filtering on the incoming burst signal. It has programmable coefficients to derive the correct data filter. The coefficients are extracted from the burst preamble. This block also performs burst alignment and down-samples the 2-samples-per-symbol signal down to symbol rate. Once the preamble is passed, the MFE fixes the filter coefficients and performs data filtering on the payload signal.

4. The LMS block is a small adaptive equalizer that compensates drift effects occurring during the burst payload. Also, since it has equalizer properties, it compensates for the remaining mismatch between the matched filter required for successful communication and the actual filter coefficients residing in the MFE block. This LMS block is an option that can be avoided by providing the adaptive means in the MFE block.

5. The DMP block translates the quadrature modulated symbols available at the output of LMS back to data symbols. The data symbols then can be further processed by channel decoding and source decoding.

Down-conversion: DOC

Figure 12:
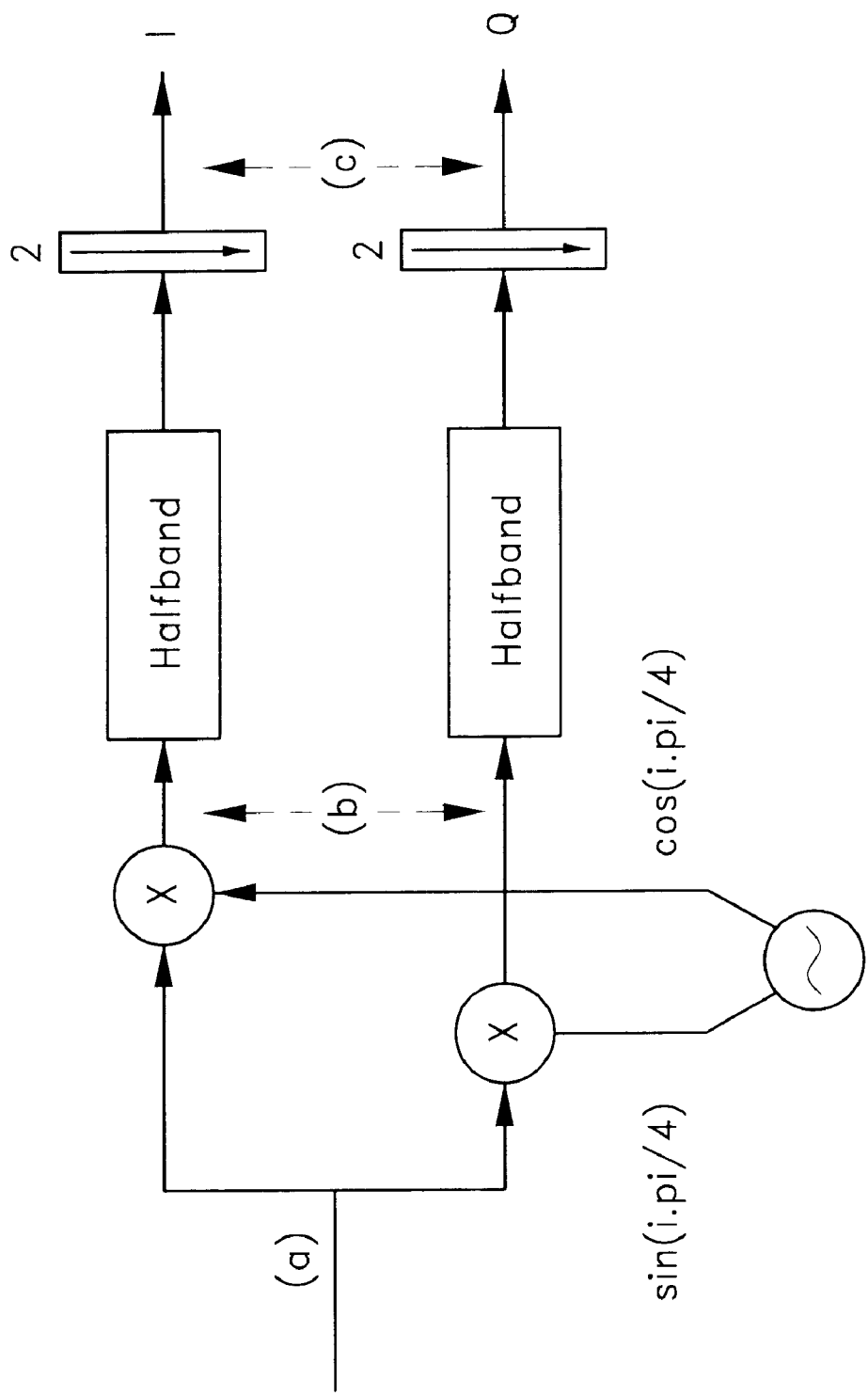
FIG. 12 shows an example of a DOC block of FIG. 11.

The DOC block performs down-conversion of the received burst signal from pass-band to baseband. It is presented in FIG. 12.

The incoming signal is down-converted to baseband by mixing it with a local fixed carrier pulsating at one fourth of the sample frequency. The mixing operation is implemented by multiplication with sine and cosine values of the carrier, which is particularly attractive for digital implementation at the given carrier frequency: the sine and cosine values are part of the set (−1, 0, 1).

Figure 13:
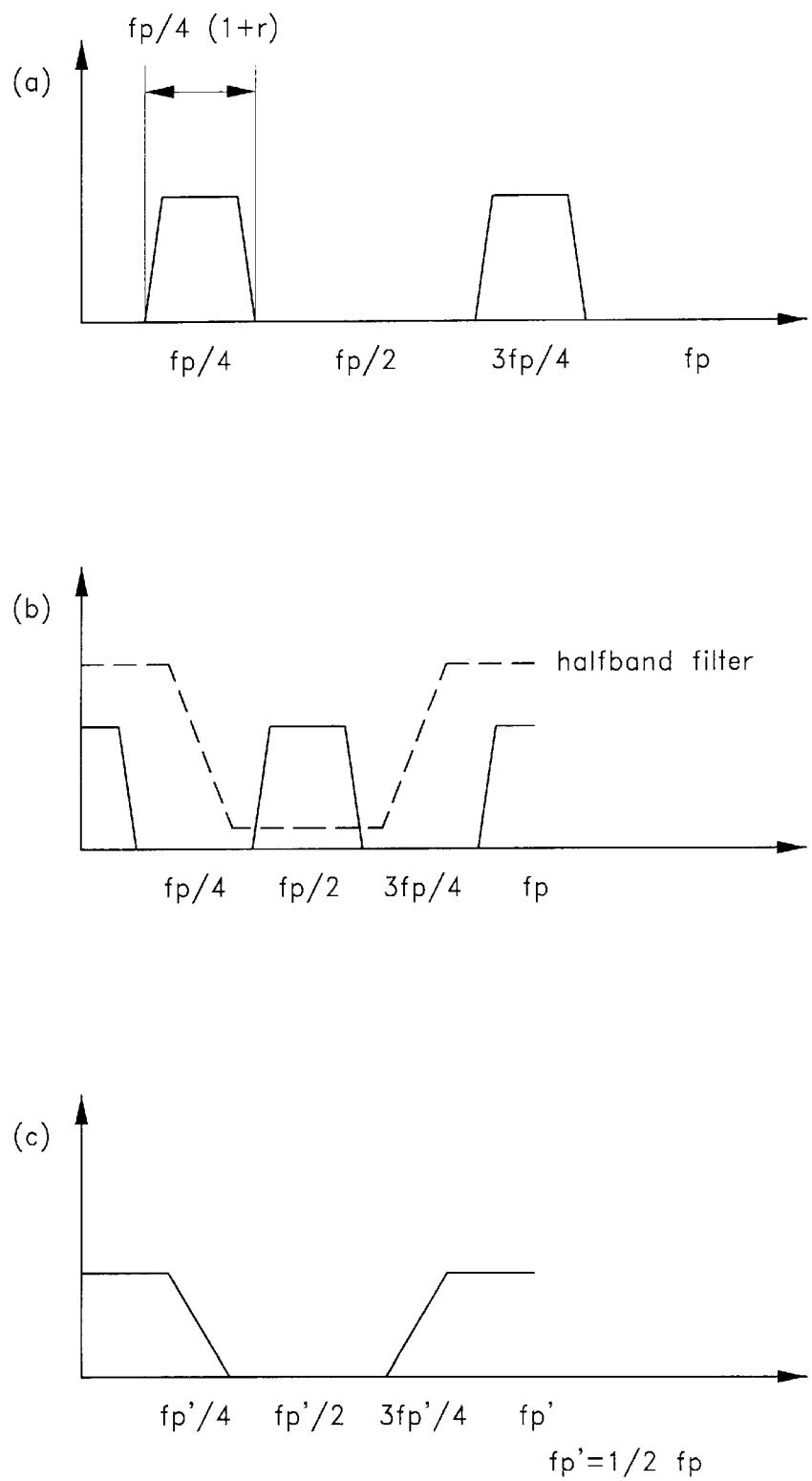
FIG. 13 shows Spectra in the DOC (a) at the input (b) after the mixer (c) at the output.

Next, the signal is passed to a halfband FIR filter in order to remove the residual image at half of the sample frequency that originates from the down-conversion. A halfband FIR filter is a FIR filter that cuts off all frequency components above one fourth of the sample frequency. It has the property of having half of the coefficients zero. At the end of the halfband filter, the signal is down-sampled by a factor 2. The spectra at different locations of this block are shown in FIG. 13.

Figure 14:
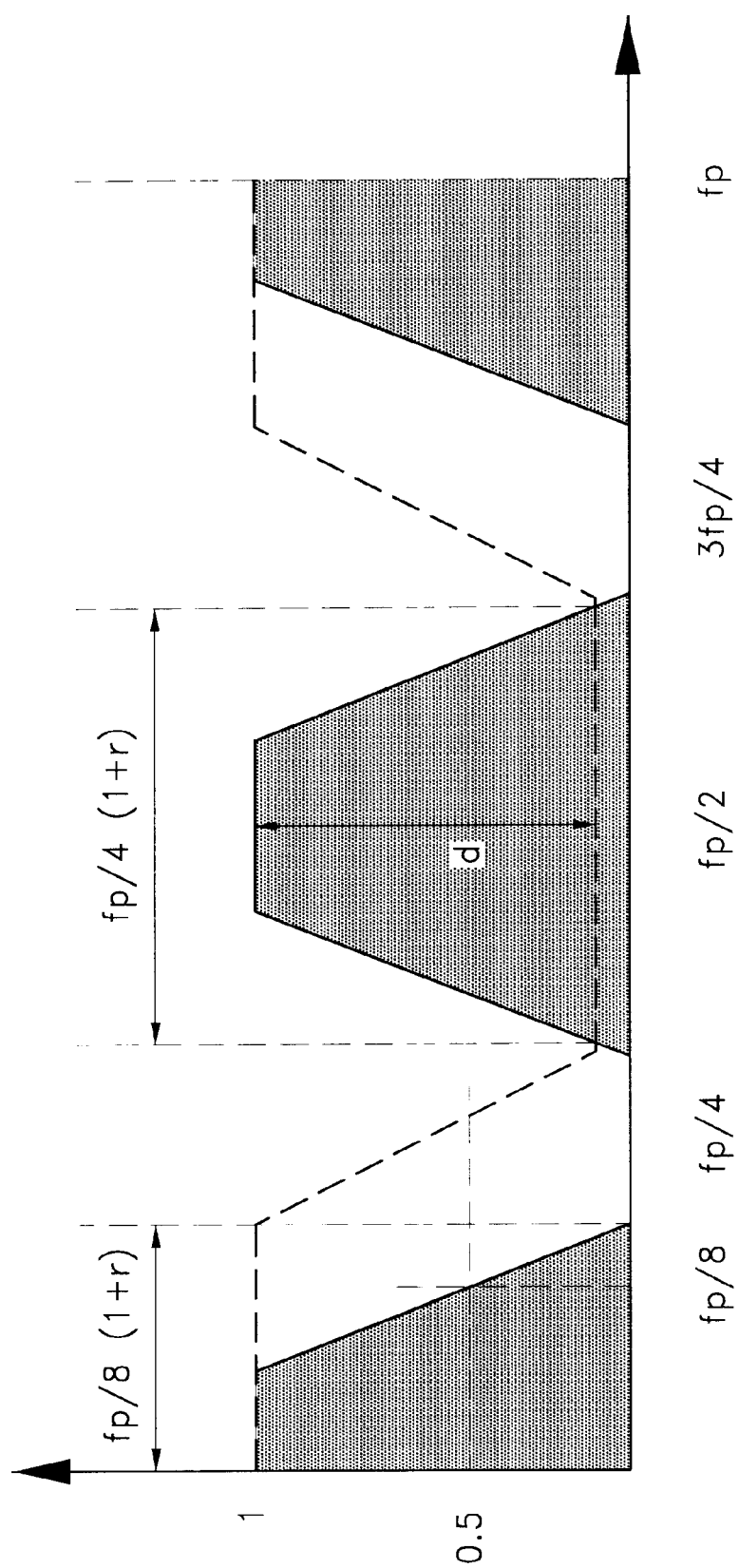
FIG. 14 shows Halfband Filter Requirements for the receiver architecture of FIG. 11.

The halfband FIR requirements are derived by considering FIG. 14, which shows the signal spectrum at the input of the halfband filter. The received signal is modulated with a root-raised-cosine pulse shaping. This shaping has one parameter, the roll-off factor r. This factor determines how far the modulation extends beyond the minimum required bandwidth to allow ISI-free operation. This bandwidth is equal to the symbol frequency.

Since the symbol frequency is one fourth of the sample frequency, the signal bandwidth thus is fp/4(1+r). The halfband filter has to remove the image band, located the fp/2, that results from the down-conversion. The dashed line shows the desired response of the filter. Besides this response requirement, the halfband FIR also needs to have a flat response inside the signal band, in order not to introduce amplitude distortions. The required suppression d that is offered by the roll-off factor is a function of the residual ISI level that is observed during data detection in the receiver.

For contemporary modems, the roll-off factor r resides between 0.25 and 0.5. Since the receiver is capable of receiving burst signals with varying roll-off factor, the halfband filter therefore should be designed to pass the widest burst signal (the one with the highest roll-off factor).

Given these observations, the halfband filter is designed using a minimum-squares Parks-McLellan algorithm, with two bands:
- a pass-band region from DC to fp/8*1.5, with response 1 and relative ripple 1,
- a stop-band region from fp/2–fp/8*1.5 with response 0 and relative ripple 1.

A 20-tap filter yields suppression d=–40 dB, which was found sufficient for QPSK/QAM16 constellations at the projected noise levels.

Activity Detection and Gain Setting: AGD

After the DOC block a baseband signal at 2 samples per symbol is available. The baseband signal contains an I branch and a Q branch.

In the AGD block, this signal is observed to detect the start of an incoming burst signal. Also, the power level is estimated when activity is detected. Using this estimation, a gain correction is applied.

Figure 15:
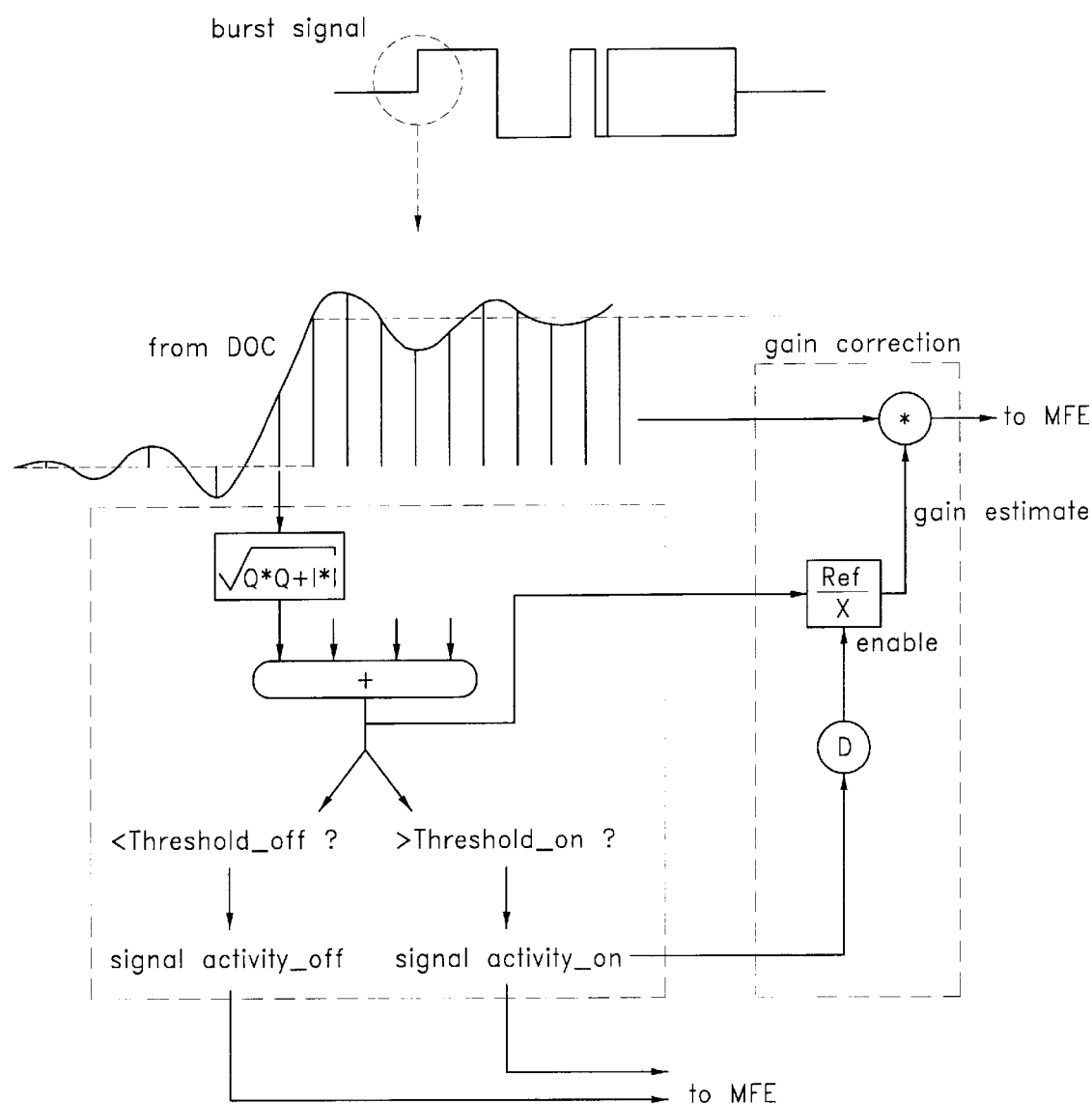
FIG. 15 shows an example of a AGD block of FIG. 11.

The operation of the AGD block is shown in FIG. 15.

The sampled data signal that is shown is the first part of the preamble out of the burst signal. The AGD continuously monitors the average power level by evaluating the amplitude for each I and Q sample, and then averaging this over 4 signal amplitude estimations.

This averaging reduces the noise sensitivity. As soon as the average exceeds a predefined threshold, the presence of a signal burst is assumed, and activity is signalled to the other blocks in the system.

Also, the activity turn-on event is used to set the gain correction. The gain correction circuit is implemented by means of a multiplication with a constant. The constant is dependent on the on the signal level observed during the preamble, and is obtained by dividing a reference value by the observed value. This way, the signal is scaled to the correct reference.

Figure 16:
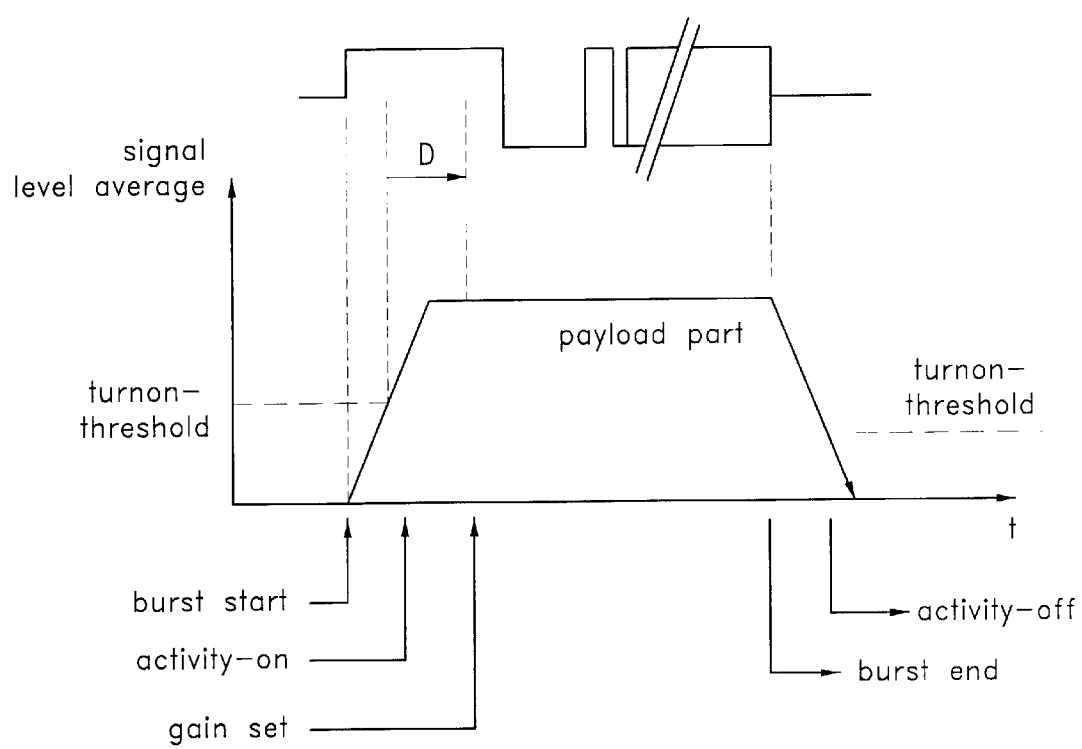
FIG. 16 shows an example of AGD operation FIG. 11.

The AGD operation is shown graphically in FIG. 16. The upper part shows the signal burst, while the lower part shows the output of the averaging as a function of time. As the burst starts, the observed signal level increases. As the average increases above the turn-on-threshold, activity-on is signalled. The gain programming circuitry then delay this event by an amount D, before deciding on the actual signal level. As the burst ends, the average drops again, and as soon as it decreases below the turnoff threshold, activity-off is signalled.

Matched Filter Evaluation: MFE

The signal that leaves the AGD block has no gain error left. Also, two events are available (activity_on and activity_off), that flag the start and end of the signal burst.

The next task is now to perform the data filtering. This is done in the MFE block. The general operation of this block is as follows: during the preamble, the MFE coefficients are determined. Next, burst alignment is performed, and the transition to the payload is detected. During the payload, the MFE coefficients are used to perform data filtering.

First, it will be explained how the MFE coefficients are determined. As was demonstrated in the receiver requirements derivation, the coefficients are a time-reversed complex-conjugate of a single data pulse.

Figure 17:
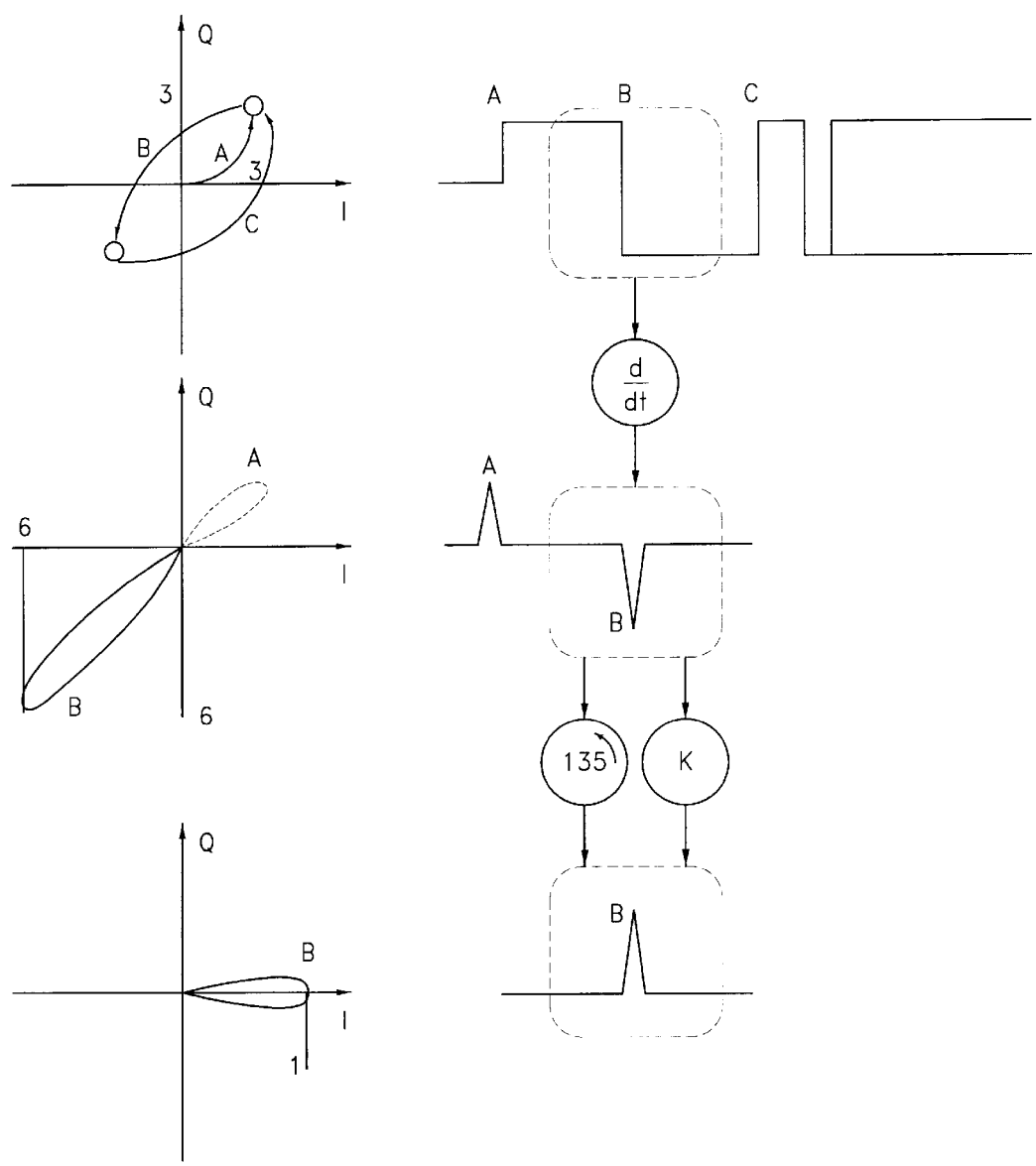
FIG. 17 shows the derivation of the data filter coefficients out the preamble.

Thus, given a sampled impulse response of the channel $K(z)$, the MFE coefficients need to be programmed with $K^*(z^{-1})$. In the presented burst preamble, there is however no isolated data-pulse. Rather, the channel impulse response is extracted from the preamble by means of a mathematical transformation, as shown in FIG. 17. The impulse response information is extracted from the first down-going transition in the preamble (indicated in the dashed square in the figure). The step (B) on the I and Q branch is differentiated with respect to time in order to obtain an impulse response. Since this is a negative impulse occurring on both the I and Q branch, another transformation is needed to return a positive, real unit impulse. To do this, we rotate the observed differentiated response over 135 degrees and also scale the signal level to unity. This simple two-step process thus allows to obtain the channel impulse response out of the step function encoded in the preamble. This method works for impulse responses that are shorter then the width of a limited window around (B). For longer impulse responses, other events in the preamble (like (A) or (C)) will show additional influence and cause coefficient programming errors. In turn, these programming errors causes ISI. Such a longer impulse response occurs for instance due to the presence of high amounts of group delay distortion.

Figure 18:
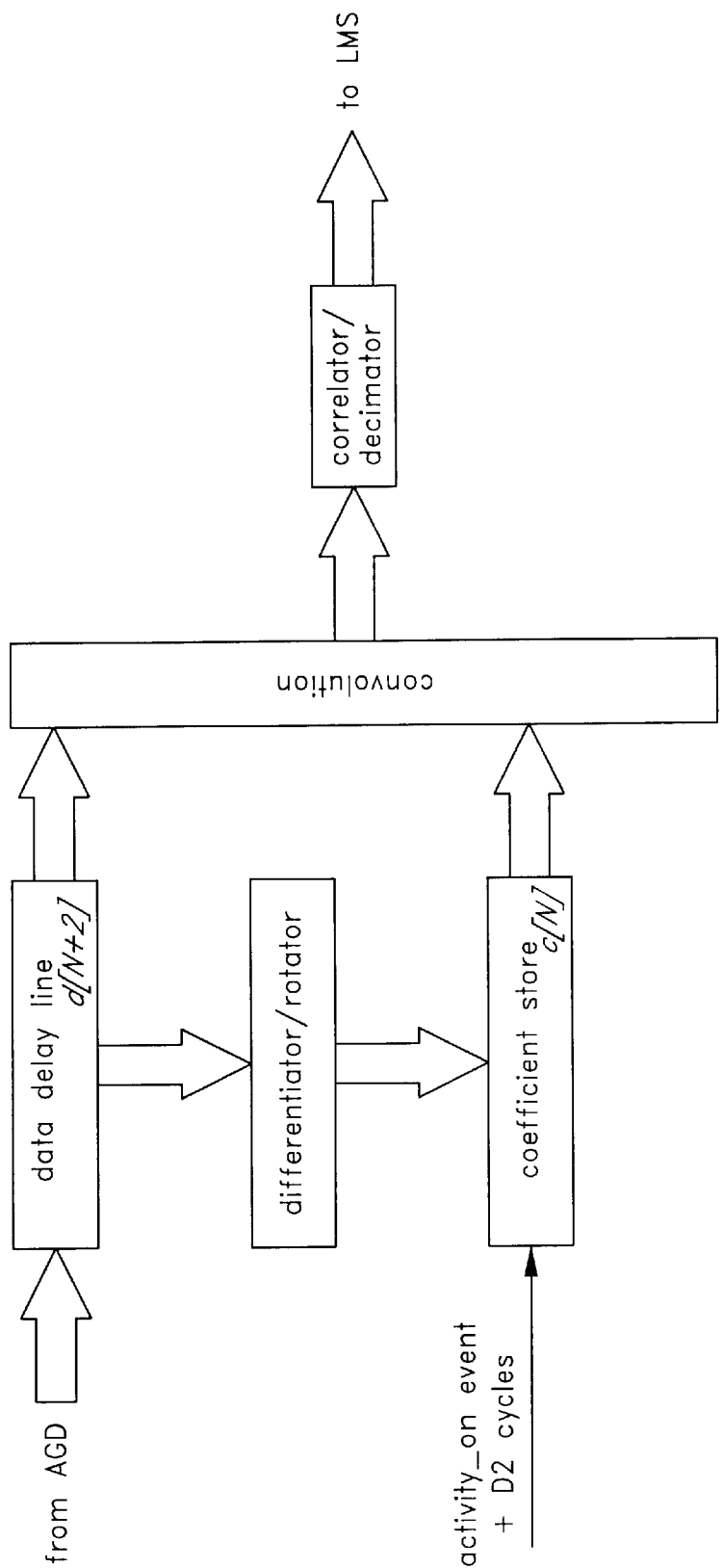
FIG. 18 shows an MFE block FIG. 11.

Next, the MFE is discussed. FIG. 18 shows the layout of the MFE block. It consists of:

A data delay line. This is needed to perform the data filtering operation. Given a data filter dimensioning of N coefficients, we need the data delay line to contain N+2 samples. The two extra samples are needed to perform successful differentiation. The data delay line has both an I and Q branch.

A differentiator+rotator. This algorithm performs the operation presented in FIG. 17. Below this operation is expressed mathematically. Given the data samples d[N+2], the (discrete) differentiation is evaluated as:

$$d'[i]=d[i+2]-d[i] \tag{22}$$

As is seen, the differences are taken with a step of two. This is because the estimation is done on an over-sampled signal (two samples per symbol).

Next, the data sequence is rotated. The rotation over 135 degrees is an easy linear combination. Given a complex number i+jq, the rotated version is given by:

$$i'=-i/\text{sqrt}(2)-q/\text{sqrt}(2) \tag{23}$$

$$q'=i/\text{sqrt}(2)-q/\text{sqrt}(2) \tag{24}$$

The normalization factor to obtain a unit impulse is determined as follows: multiplying the differentiated values with a factor 1/6.1/sqrt(2) will reduce the pulse height on Q and I branches to 1/sqrt(2). The effective pulse length then is equal to the required 1.

Bringing the differentiation, rotation and scaling operation together the required operation of the differentiator/rotator block is found:

$$c_i[i]=1/12*(d_i[i+2]-d_i[i])+1/12+(d_q[i+2]-d_q[i]) \tag{25}$$

With respect to digital hardware implementation, we see that only adder, subtractor and shift operators are necessary.

A coefficient store to hold the coefficients c[N] after they are evaluated.

The coefficient store is updated a well defined time after the activity detection event.

A convolution block, that performs the convolution between d[ ] and c[ ] during payload reception, thereby performing data filtering.

A correlator/decimeter, that performs the burst alignment. During normal operation, it will down-sample the input data stream from two samples per symbol to 1 sample per symbol. The correlator/decimeter and the operation of it is discussed next.

Figure 19:
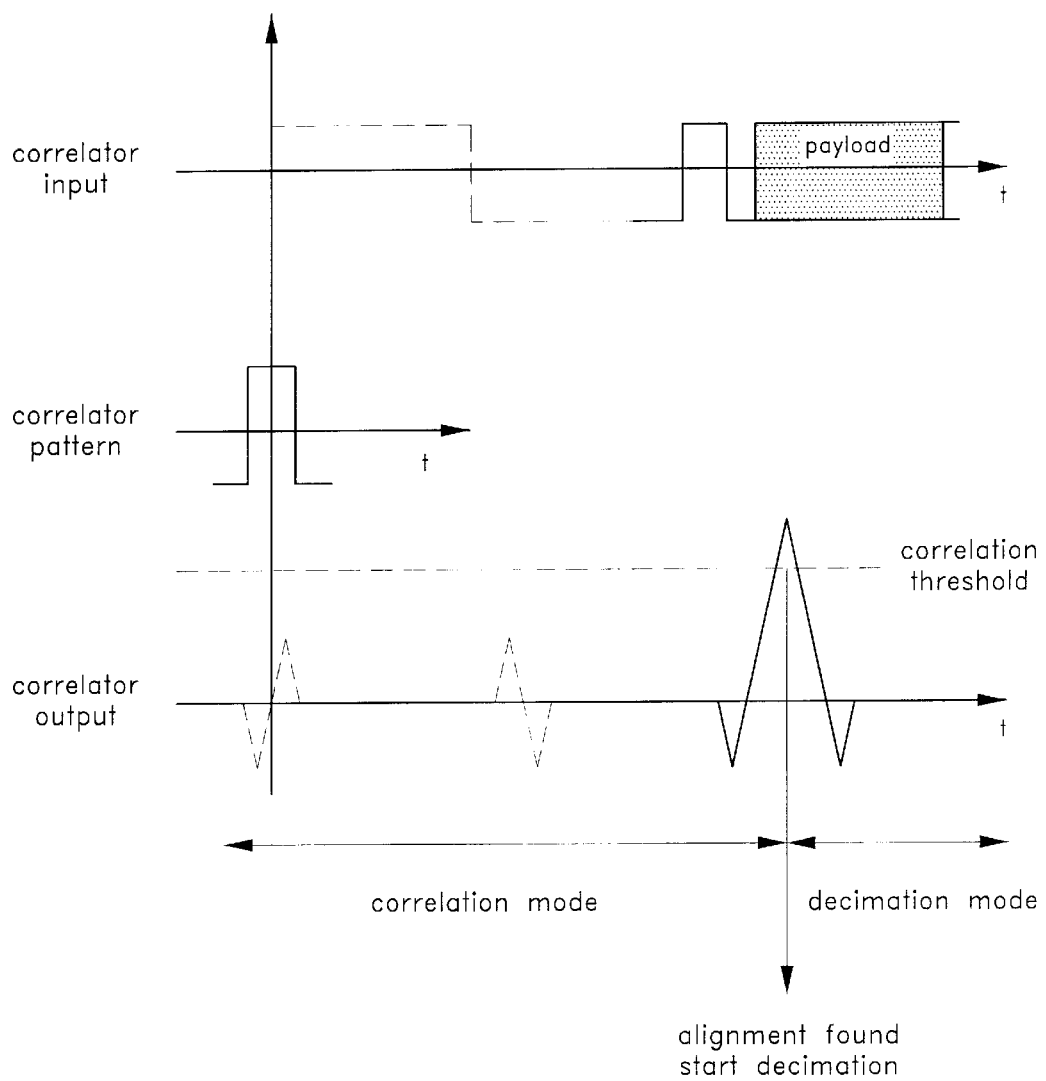
FIG. 19 shows a Correlator Operation.

The correlator/decimeter operation is shown in FIG. 19. The input of the correlator is taken from the data filtering (the convolution operation). The input signal will be a filtered burst signal. Since the first part of the burst signal is used for coefficient extraction, it will not appear at the convolution output. Therefore it is indicated with dashed lines.

The correlator/decimeter starts as soon as the data filter coefficients are found. It will first seek the start of the burst by performing burst alignment. To do this, it correlates the samples coming out of the convolution operation with a special data pattern, equal to the last part of the preamble. When the correlation value exceeds a predefined parameter, alignment is assumed, and the downsampling can start. The correlation maximum always occurs at the same unique sample in the burst (since the correlated signals contains no attenuation or group delay distortion effects). Therefore, the correct downsampling phase that goes from 2 samples per symbols to 1 sample per symbol, is uniquely related to the moment of burst alignment.

Tracking: LMS

The next part of the receiver is a small adaptive equalizer. Because it is small, it can fairly fast adapt to changes in the channel. It is intended to remove linear distortions that affect the payload but cannot be corrected by the MFE. These include carrier phase and frequency errors induced by the transmitter and receiver front-ends, and amplitude distortions induced by the channel.

At 1 sample per symbol, the LMS equalizer is symbol spaced. The coefficient adaptations are steered by means of decision feedback. Since a receiver decision can always be wrong, the adaptations can potentially diverge in case many subsequent decision errors occur. This is a common problem in adaptive equalizers; and it is most acute at the moment of coefficient initialization.

In the presented block, the coefficient initialization is however trivial: just after MFE programming, the derived matched filter perfectly matches delay errors, and carrier frequency and phase errors. Therefore the required initial LMS coefficients are simply a dirac impulse.

Figure 20:
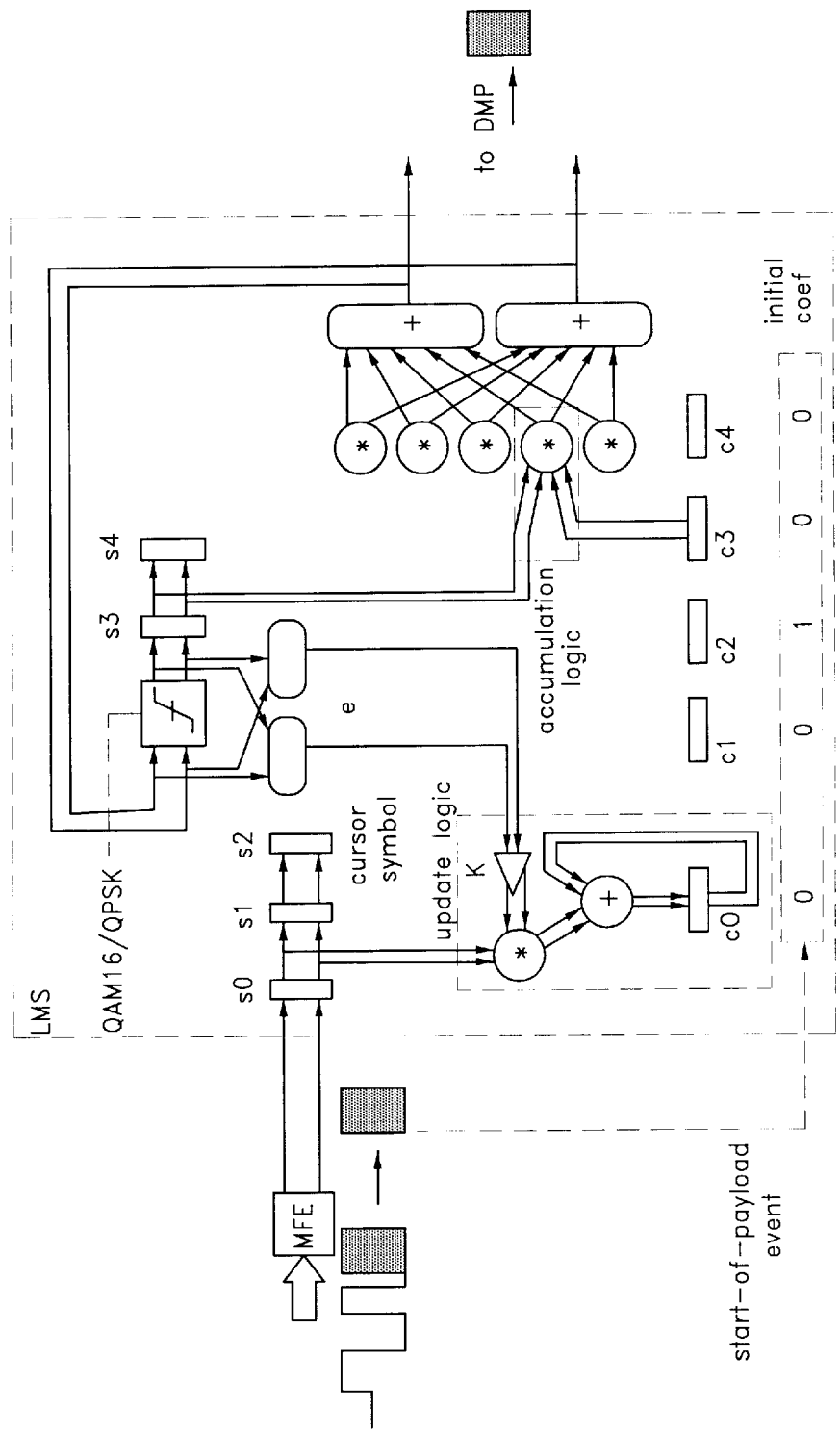
FIG. 20 shows an LMS block FIG. 11.

For the equalizer, 3 or 2 feed-forward taps and 2 or 1 feedback taps are chosen, as shown in FIG. 20. It is also possible to use implementations with another number of feed-forward and feedback taps. With this receiver concept, it is possible to restrict the number of taps. Note that if the number of taps is increased, the convergence time of the equalizer will increase too. The power of this invention is the possibility for fast convergence of the described method, taking into account that the initial situation is almost ideal. Possible candidates for number of taps are 2 to 5, or higher.

The cursor symbol is installed at the tap just before the decision device. For simplicity, only part of the complete structure is shown. The figure shows all filter taps, the update logic for coefficient 0 and the accumulation logic for coefficient/tap 3. The complete filter has both of these for each tap and coefficient.

The equalizing process is programmed by the following parameters:

1. QPSK or QAM16 demodulation requires a different decision device to be enabled.
2. The LMS step size, the factor K in the figure, is made variable. A large step size allows the equalizer to track fast variations, but results in a greater residual error. A small step minimizes the error, but limits the tracking speed. The variable (programmable) step allows to set the correct tracking speed for a given environment. A value smaller than 0.04 was found appropriate for typical upstream CATV channels. This low value can be chosen because at the start of the payload the MFE matches perfectly all channel imperfections.
3. Finally, the start of the payload must be signalled in order to properly initialize the coefficients. The start-of-payload event is generated out of the MFE block as a result of burst alignment.

Symbol-to-Data translation: DMP

After data filtering (MFE) and equalization (LMS), the output symbols should ideally fall exactly on top of the original transmitted symbols. In reality, this is never the case. Due to noise effects, which cannot be compensated, and residual ISI effects, the LMS output symbols can differ slightly from the original transmitted symbols.

To retrieve the original symbols, and translate these to the user data inserted at the transmitter side, the DMP block is used. This block observes an LMS output constellation, hard-limits it, and translates the symbol back to user data values.

Figure 21:
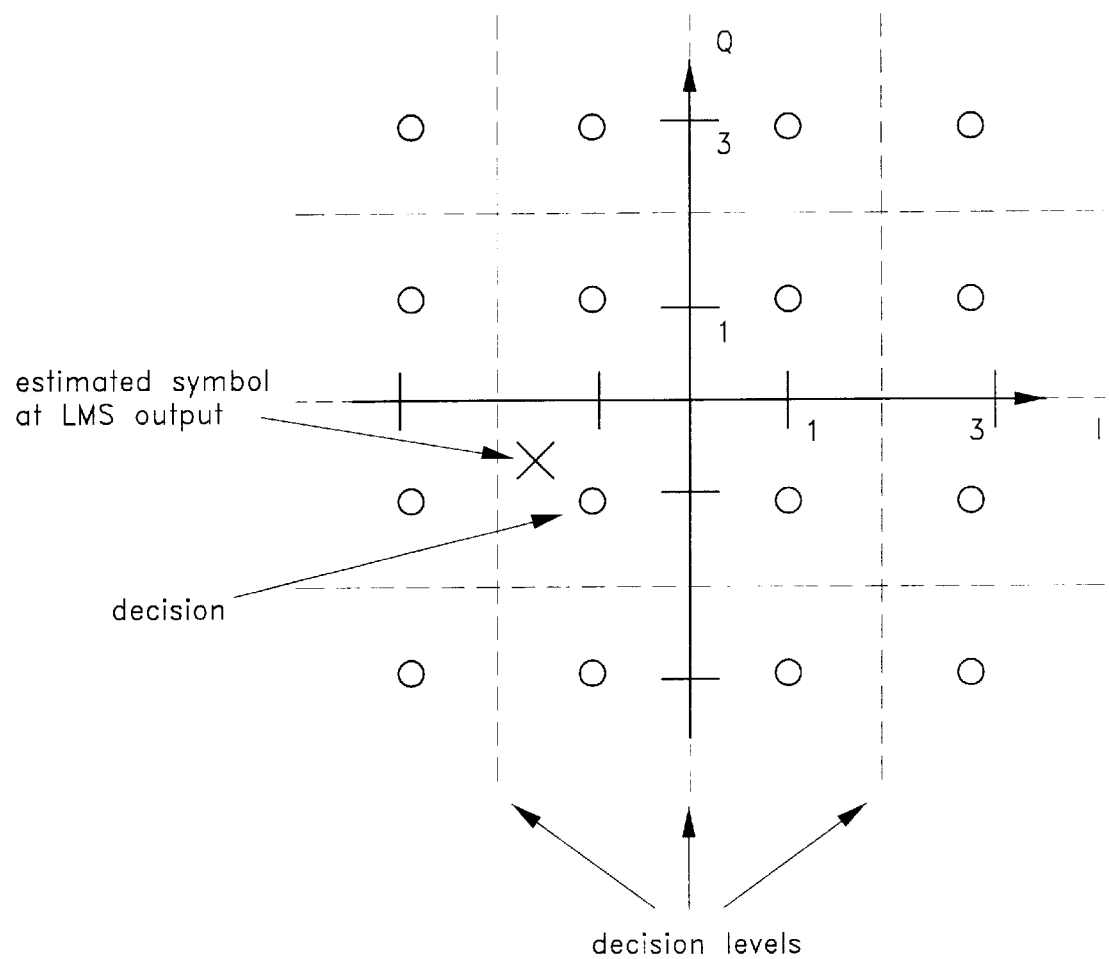
FIG. 21 shows the operation of a DMP block.

This process is shown in FIG. 21 for the case of a QAM-16 constellation. Each constellation point is located at the center of a bin. The edges of these bins are the decision levels. An LMS output symbol (indicated with an X-cross in the Figure) is compared to these decision levels to select a bin in which the actual symbol should reside. Once this symbol is decided, it is translated back to a user data value.

Because of the hard-limiting, the receiver can make a wrong decision. Once the LMS output symbol moves across a decision boundary, the DMP block will take another decision symbol. Thus, in case the LMS output symbols strongly deviate from the expected positions, it is likely that the wrong symbols will be decided. In that case, a transmission error occurs.

Second Preferred Embodiment of the Invention

The receiver architecture is now mapped to a preferred implementation. A burst-mode receiver is conceived such that the hardware initialization time between the reception of two bursts is as small as possible. This will allow a minimal burst spacing.

The algorithms presented up to now are of the discrete-time type, for which digital hardware is an ideal container. Only the initial tuning function, that translates the modulation carrier from the transmission frequency to symbol frequency, needs processing by analog parts.

Figure 22:
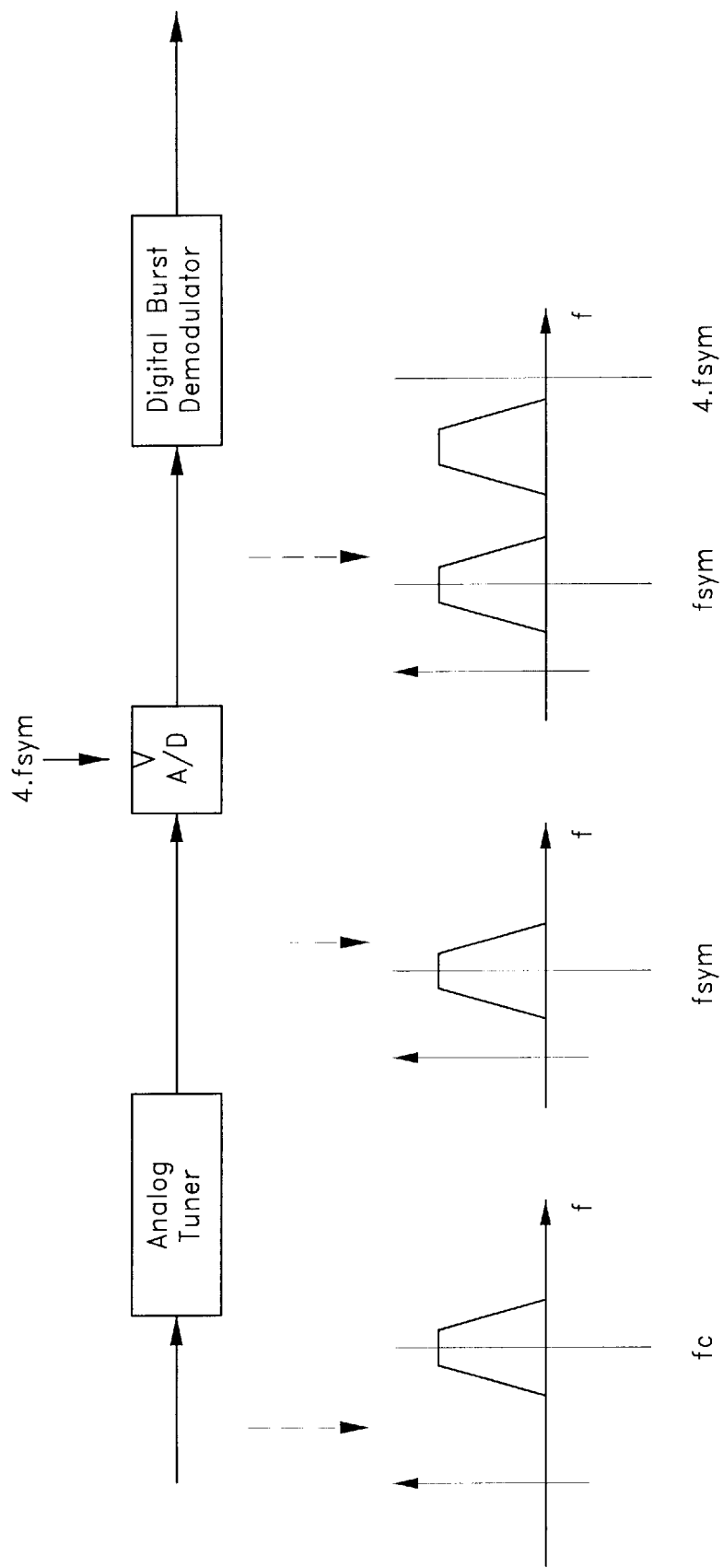
FIG. 22 shows a System Implementation according to the invention.

The receiver system, shown in FIG. 22, consists of:
1. An analog frequency conversion unit
2. An analog-to-digital converter
3. A digital burst demodulator Since the symbol timing correction is performed inside of the digital burst demodulator, the analog-to-digital converter can be clocked at a fixed frequency.

The following description focuses on the implementation of the digital demodulation algorithms. In particular, the mechanism that enables minimal interburst hardware initialization time will be discussed.

The receiver algorithms discussed before are synchronized by the presence of data. Coefficient programming of coefficients in the MFE, for example, is triggered by data detection in the AGD block. Next, once the MFE produces valid output data, it triggers the LMS to start data equalization. It is easily seen that, in this chain of algorithms, synchronization is done between neighboring algorithms. The passing of data itself is the synchronization act.

Each algorithm is executed by a dedicated digital hardware machine, comprising a local controller and a data path. The data path executes the data processing operations inside the algorithm, while the local controller performs operation sequencing, and algorithm synchronization.

In the case of the second preferred embodiment, the data-driven architecture is particularly useful because of the absence of feedback loops over the chain of algorithms. In that case, all data processing parallelism available through the use of multiple local controllers is obtained. Also, the correct system operation is guaranteed from the correct operation of the individual blocks.

In contrast, when algorithm feedback loops are present, data processing parallelism can be restricted by critical path requirements of the feedback loops. As an example of this, it can be verified that in the following pseudocode snippet, process 1 and process 2 cannot ever execute in parallel (since process 2 need value v1, which is handed over directly from process 1).

```
input1=previous_output2;
process 1 (input1,v1)
  accept input1;
  do processing;
  send v1;
process 2 (v1, output2)
  accept v1;
  do processing;
  send output2;
previous_output2=output2;
```

A second drawback of feedback loops in data driven architectures is that the correct system operation is not guaranteed from the correct operation of individual components alone.

We conclude the preferred embodiment of the loosely coupled receiver algorithm in the invention also are best implemented in a data-driven feed-forward architecture.

Figure 23:
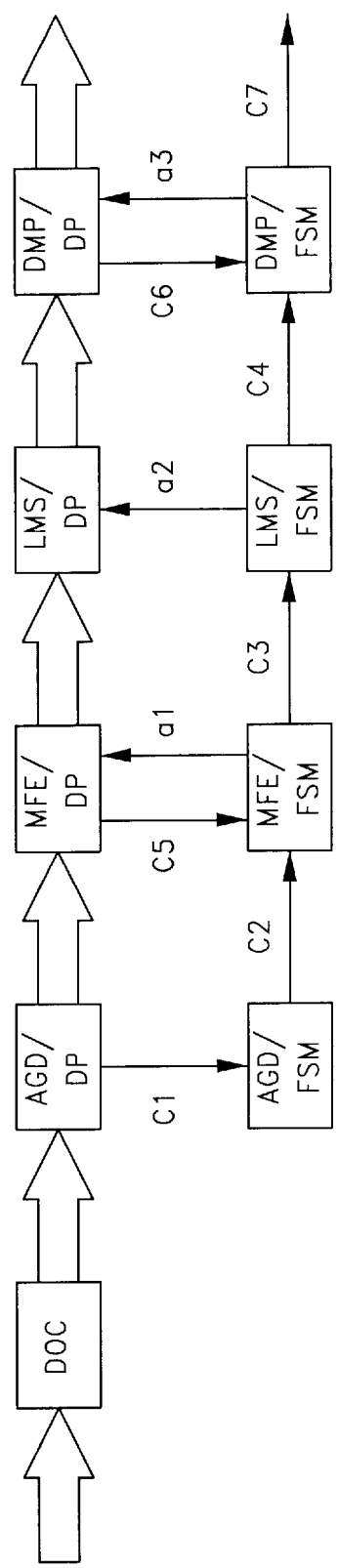
FIG. 23 shows an Implementation using a feed-forward-FSM structure according to another preferred embodiment of the invention.

FIG. 23 shows the internals of the digital burst demodulator. The algorithmic chain that was presented above is recognized. Apart from the first block (DOC), in the preferred embodiment, all blocks consist of both a finite state machine (FSM) and a datapath (DP). Such blocks have more than one mode of operation, and behave differently when a burst is being received than when not. Datapaths are constructed from bitparallel digital hardware such as registers, adders, multipliers and shifters. Finite state machines are constructed from digital hardware including random logic and registers.

The chain of blocks includes:

1. A down-conversion block DOC, for conversion from pass-band to baseband.
2. The AGD block, for activity detection and gain control.
3. The MFE block, for matched filtering, timing correction and delay distortion correction.
4. The LMS block, for adaptive equalization of the channel.
5. The DMP block, for symbol detection.

The wide arrows between the blocks show the flow of data. The data, consisting of samples of the burst signal, is passed from datapath to datapath.

The thin arrows show the flow of control. Arrows directed to an FSM block indicate an event being signalled to the control program running in the FSM. Arrows directed from an FSM indicate a particular mode of operation being selected. When such a mode of operation is passed to a datapath block, it is interpreted as an instruction by this datapath. When it is passed to another FSM, it signals a particular event to this other FSM.

It is seen that the flow of control is free of feedback loops. More specifically, the mode of operation is controlled from left to right. The signals c1 through c7, and a1 through a3 have the following function:

1. c1 signals that the turn-on-threshold of the AGC is exceeded. This is interpreted as the start-of-burst condition by the AGD FSM. It is obtained by observing the power of the incoming burst signal, as was discussed before.
2. The AGD/FSM observes c1 and transmits c2 the MFE/FSM. c2 is a delayed version of c1. It is transmitted when the training sequence has rippled into the MFE/DP block.
3. The instruction on a1, sent to the MFE/DP block, selects when the MFE coefficients are to be programmed. The MFE/DP also detects the burst alignment pattern at the end of the preamble. In that case, an event on c5 is passed to the MFE/FSM. Based on this event, the MFE/FSM can then select the correct downsampling phase for the MFE/DP.
4. The event on c3, passed from MFE/FSM to LMS/FSM, indicates when the MFE coefficients have been obtained, burst alignment has been done, and a valid signal is passed to LMS/DP. This event is translated into an instruction on a2, that will set the coefficients equalizer in LMS/DP to their initial state.
5. When the LMS/DP block produces the first sample of valid data, the LMS/FSM signals this to DMP/FSM through c4. DMP/FSM starts the detection of data symbols on DMP/DP through a3. The symbols are also counted, and when the preselected burst count is reached, the start of data symbol detection signal a3 is released and the end-of-frame is indicated through c6 and subsequently through c7.

In case of the auto detect mode, the symbols are not counted in order to terminate the burst reception, but rather an end-of-burst condition is evaluated by observing the power of the incoming burst signal. The condition evaluates to true when the turnoff-threshold is exceeded.

Because the flow of control is essentially feed-forward, the algorithm becomes independent of the latency of individual blocks. It is, for example, possible that the AGD and MFE are decoding one burst when the LMS and DMP are still processing the previous one. The interburst spacing is therefore only needed to allow the AGD to detect a burst gap.

Performance of the Receiver According to the Preferred Embodiment of the Invention In this section, the performance of the receiver is examined. The following transmission distortions are considered:

1. Noise with a gaussian distribution is added to the burst signal before reception starts. The noise power level is varied with relation to the burst signal power level to see how sensitive the receiver is with relation to noise influences.
2. Group delay distortion is introduced on the burst signal before reception.
3. Symbol timing drift and carrier phase/frequency drift is introduced during the payload to test the adaptiveness of the receiver.
4. The power level of the burst signal is varied to see the operation of the AGD.
5. Amplitude distortions are introduced on the burst signal before reception.

In order to judge the performance in an objective way, a quality measure of the reception has to be used.

Two quality measures are referenced here:
1. The number of symbol errors occurring in the transmission of a burst. This translates to a symbol error rate, which is the ratio of the number of symbol errors to the total number of transmitted symbols.
2. The Errored Vectored Measure (EVM) constellation quality measure.

The EVM constellation quality measure is defined as follows:

$$EVM = \sqrt{\frac{1}{N} \sum_N ((I - I_r)^2 + (Q - Q_r)^2)} \quad (27)$$

where N equals the number of symbols that are included in the quality estimate, I and Q the symbol value of the received symbol, $I_r$ and $Q_r$ the symbol decided by the DMP block. Since this formula still is dependent on the absolute size of the constellation, a normalization convention is used: the outer constellation symbols are assumed to be located at 1. The EVM quality measure is dimensionless and expressed as a percentile value. For judging the reception of a burst signal, we use the EVM performance figure as obtained from the symbols contained in the signal burst (Thus N is equal to the number of symbols in the payload).

The EVM figure has no direct relation to symbol errors. This is because the EVM figure makes abstraction of the distribution of the received symbols around a desired constellation point.

If we make an assumption about this distribution, we can however obtain an approximate relation. Table 2 shows this relation for the case of a gaussian distribution (which occurs when only gaussian noise is present in the channel).

TABLE 2

Relation Symbol Error rate and EVM for a gaussian distribution

| EVM (%) | SER |
|---------|-----|
| 7 | $3.10^{-6}$ |
| 8 | $5.10^{-5}$ |
| 9 | $3.10^{-4}$ |

The target symbol error rate for the receiver is a $5.10^{-5}$ symbol error rate under realistic channel conditions. In that case, the achieved bit error rate including channel coding obtained by the receiver is comparable to many of the contemporary high-speed cell-based communication systems (bit error rate=$10^{-10}$).

Noise Performance

The receiver was tested in a Monte Carlo set-up, where very long bursts were transmitted until 10 symbol errors were observed. According to statistics theory, an observation of 10 events (symbol errors) guarantees a certainty of 90 percent that the actual value is less then 50 percent wrong. This is generally considered as a good estimate.

Figure 24:
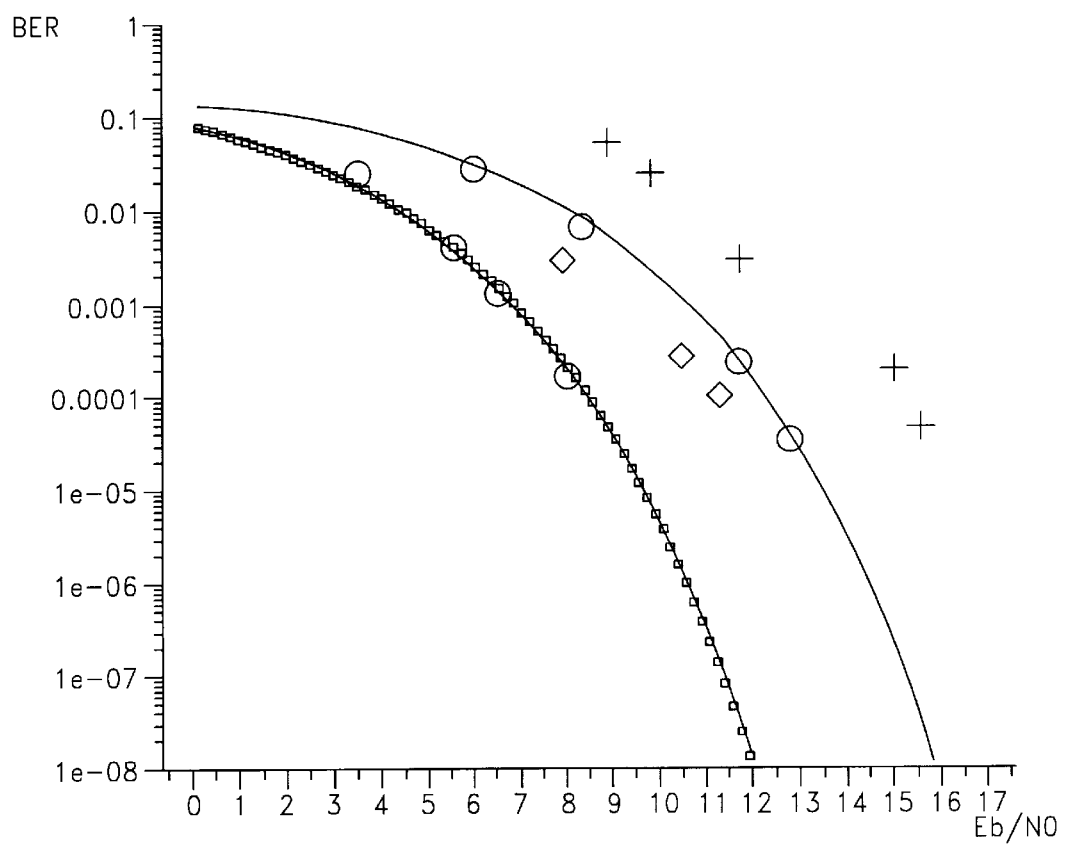
FIG. 24 shows Noise Performance. Circle=Theory (QAM16 or QPSK). Diamond=QPSK mode. Cross=QAM16 mode.

FIG. 24 shows the receiver performance at different noise levels in the channel. The continuous lines are the ones obtained by theoretical considerations of achievable receiver performance. To verify these, a model of this perfect receiver was constructed, and a Monte Carlo simulation was set-up. The circles in the Figure show simulated working points.

Next, the proposed receiver for burst-mode-transmission was simulated. The results for QPSK and QAM16 modulated bursts are indicated with diamond and cross shapes respectively.

Group Delay Distortion Performance

By simulating different amounts of group delay distortion on a received burst signal, it is estimated how quickly the EVM performance of the receiver degrades (due to residual ISI effects). The figures in table 3 show the obtained performance for a QAM16 with a symbol period of 400 ns (symbol rate 2.5 Msym/s), and 10 filter taps (10 I and 10 Q coefficients) in the MFE block. To demonstrate the power of this equalization concept, a similar simulation was set-up on a receiver that uses no adaptive, but fixed data filter coefficients. This is shown in the third column of the table. This clearly demonstrates the advantages of using the MFE.

TABLE 3

Achieved EVM for various group delay distortions

| Group Delay Distortion (ns) | EVM | EVM wo MFE |
|---|---|---|
| 0 | 1.4 | 1.4 |
| 65 | 2.0 | 3.3 |
| 325 | 3.0 | 16.0 |
| 650 | 5.5 | more than 20 |

Symbol Clock Drift Performance

The clock of the digital receiver is chosen to be a multiple of the transmitted symbol rate. Due to component tolerances of this clock, the actual symbol clock can slightly vary. This is usually expressed as a ppm value, which indicates how big the misalignment is after observation of one million symbols.

Since the MFE block coefficients are fixed after reception of the preamble, the required matched filter for reception therefore gradually diverges from the matched filter obtained during the preamble.

To test the sensitivity of the receiver to this, the following test was made. A payload length of 424 data bits and 48 channel coding bits was assumed. This message corresponds to 118 QAM symbols (4 bits/symbol) or 236 QPSK symbols (2 bits/symbol).

A clock deviation of 80 ppm was assumed. During the reception of one burst, the divergence of the symbol clock therefore diverges less then $80.10^{-6}*118=0.00944$ symbols for the QAM16 case, and less then $80.10^{-6}*236=0.0188$ symbols for the QPSK case.

In both case, the deviation is considered to be negligible (EVM deviations in the order of one tenth %). We therefore conclude that the drift on the symbol clock in a burst-mode transmission system has no observable effect on performance.

Carrier Phase Drift Performance

Besides drift on the symbol clock, there is also drift on the carrier frequency and phase because of manufacturing imperfections. Also this figure is expressed as a ppm value, and is interpreted as the deviation of the carrier frequency with respect to its nominal value. The carrier frequency at the receiver entrance is equal to the symbol rate. Therefore one revolution of the carrier corresponds to one symbol period. Similarly, a drift of e.g. 10 ppm means that the carrier phase deviates 10 revolutions in one million. A deviation of one revolution corresponds to the QAM16 or QPSK constellation rotating 360 degrees.

The sensitivity on carrier phase drift is higher than the drift on symbol timing, because the ppm tolerance specification applies to the carrier frequency. The carrier phase drift is the integrated effect of this tolerance.

To counter effects of Carrier Phase Drift, the receiver uses the LMS block. In table 4, the receiver performance is tabulated for various tolerances on the carrier frequency clock. The first column shows the performance with an active LMS, the second one the performance when the coefficient adaptations in the LMS block are disabled. The figures justify the need for this block in the receiver architecture.

TABLE 4

Achieved EVM for various carrier phase drift

| Carrier Frequency Tolerance (ppm) | EVM | EVM wo LMS |
|---|---|---|
| 10 | 2.0 | 3.0 |
| 30 | 3.8 | 7.9 |
| 50 | 6.5 | 13.5 |

Gain Control Performance

Each burst that arrives at the receiver has travelled through a different signal path, and hence has also a different gain. The AGD block corrects gain errors on the signal. This block also performs activity detection, and this is done by fixed threshold detection.

Figure 25:
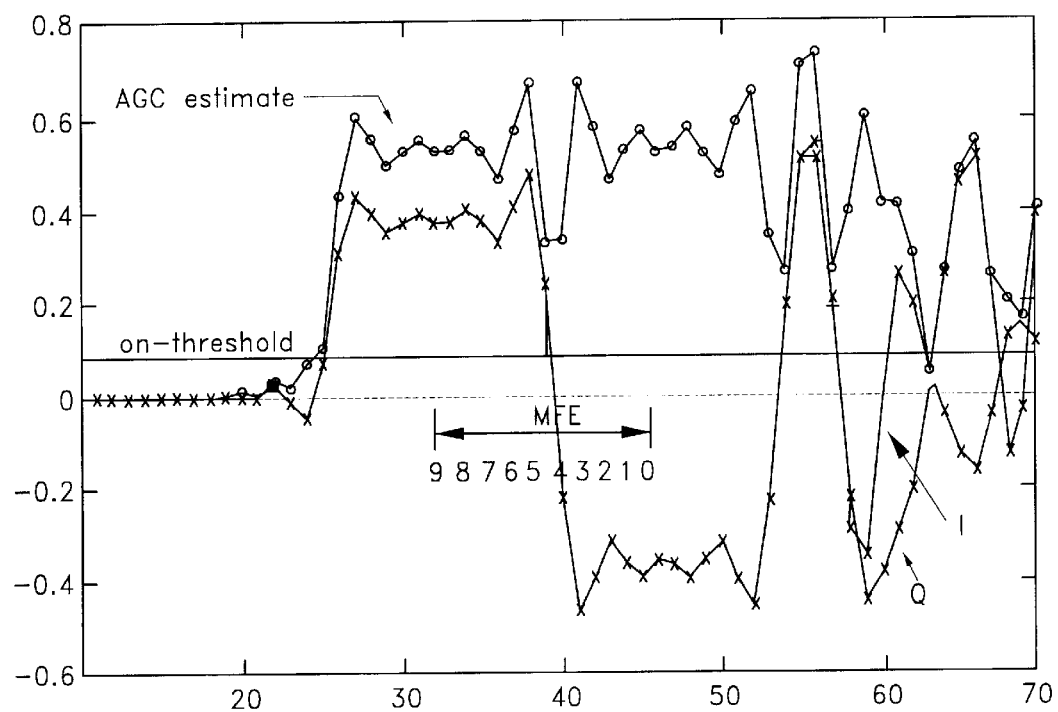
FIG. 25 shows an AGD operation. Dependence on Threshold.

A potential problem is that the activity detect point (relative to the position of the burst) becomes dependent of the gain. This is explained in FIG. 25, which shows the nominal case.

The start of a burst signal is shown as seen at the output of the DOC block (two samples per symbol).

Around sample 38, the signal power on the I and Q branch rises, and crosses the on-threshold value. An activity detect is signalled, which will program the MFE coefficients. The position of the MFE coefficients in the burst is therefore related to the moment at which activity is detected. In case of a gain error, this moment varies (since the threshold level is fixed).

Figure 26:
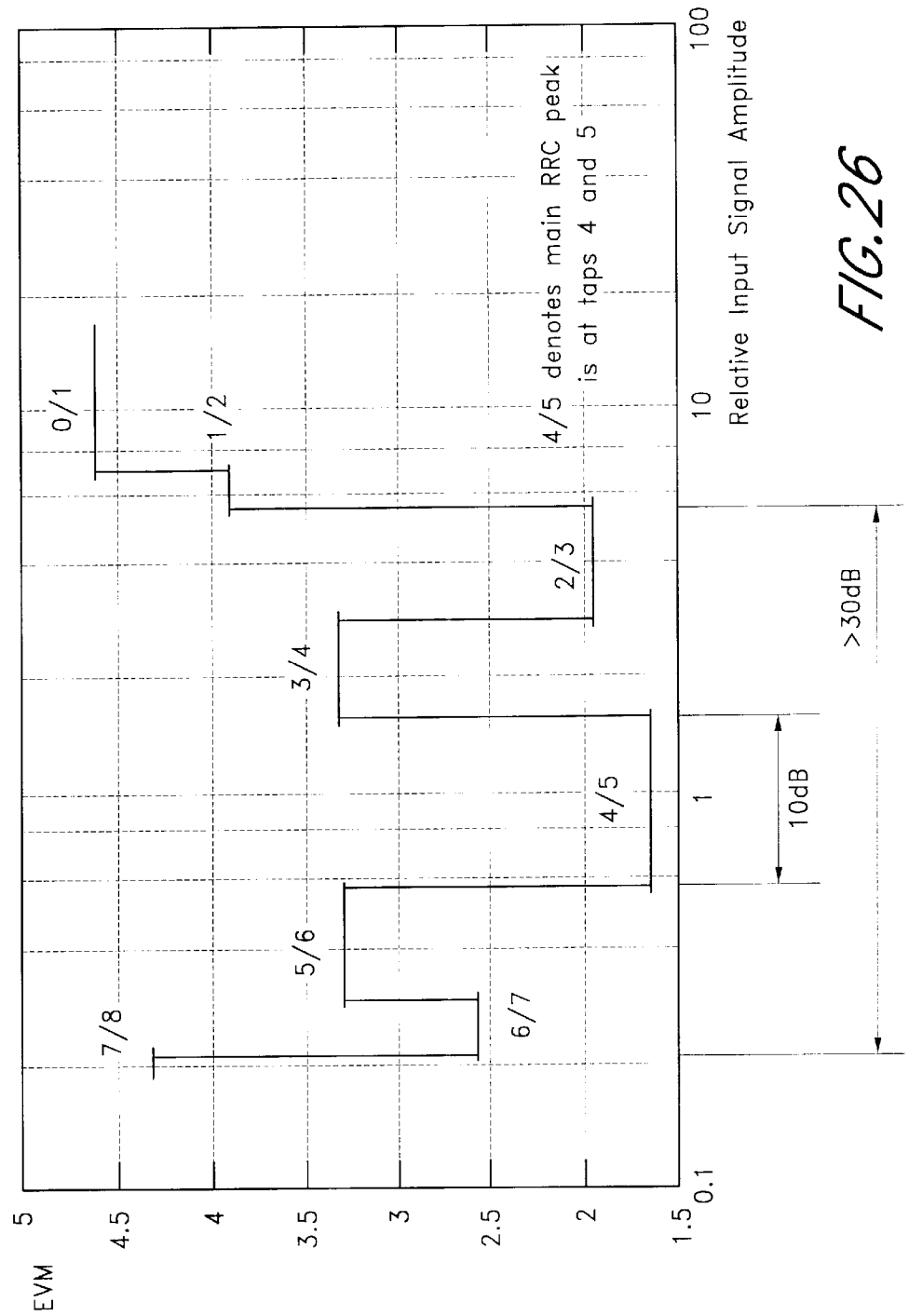
FIG. 26 shows an example of AGD Range sensitivity.

The effect of varying burst gain and holding the threshold-on level fixed is shown in FIG. 26. 10 taps are assumed in the MFE structure. The ideal case occurs at relative (burst) signal amplitude 1. At that moment, the matched filter peak (the center of the matched filter impulse response) coincides with the central MFE taps, 4 and 5. When the signal grows or weakens, activity detection is done earlier or later respectively, with relation to the burst edge. Therefore, the matched filter peak starts also to shift back responsibility forward of the MFE matched filter.

The shifting of the matched waveform in the MFE block is a discrete process since the MFE contains a limited amount of taps. The central peak shifts one sample at a time, which causes the matched filter waveform in the MFE to be aligned alternately on half and full symbol boundaries. The half symbol boundary case (for example, 5/6 and 3/4) is clearly inferior to full symbol boundary alignments.

The Figure indicates that there is approximately 10 dB of dynamic range before the matched filter waveform starts to shift in the MFE taps. If we consider EVM=3.5% to be an upper limit, we find well over 30 dB of dynamic range.

Amplitude Distortion Performance

As a last performance measure, the effect of amplitude distortions on the receiver is investigated. Although the CATV channel is designed to have a flat response, small amplitude variations will always occur.

Figure 27:
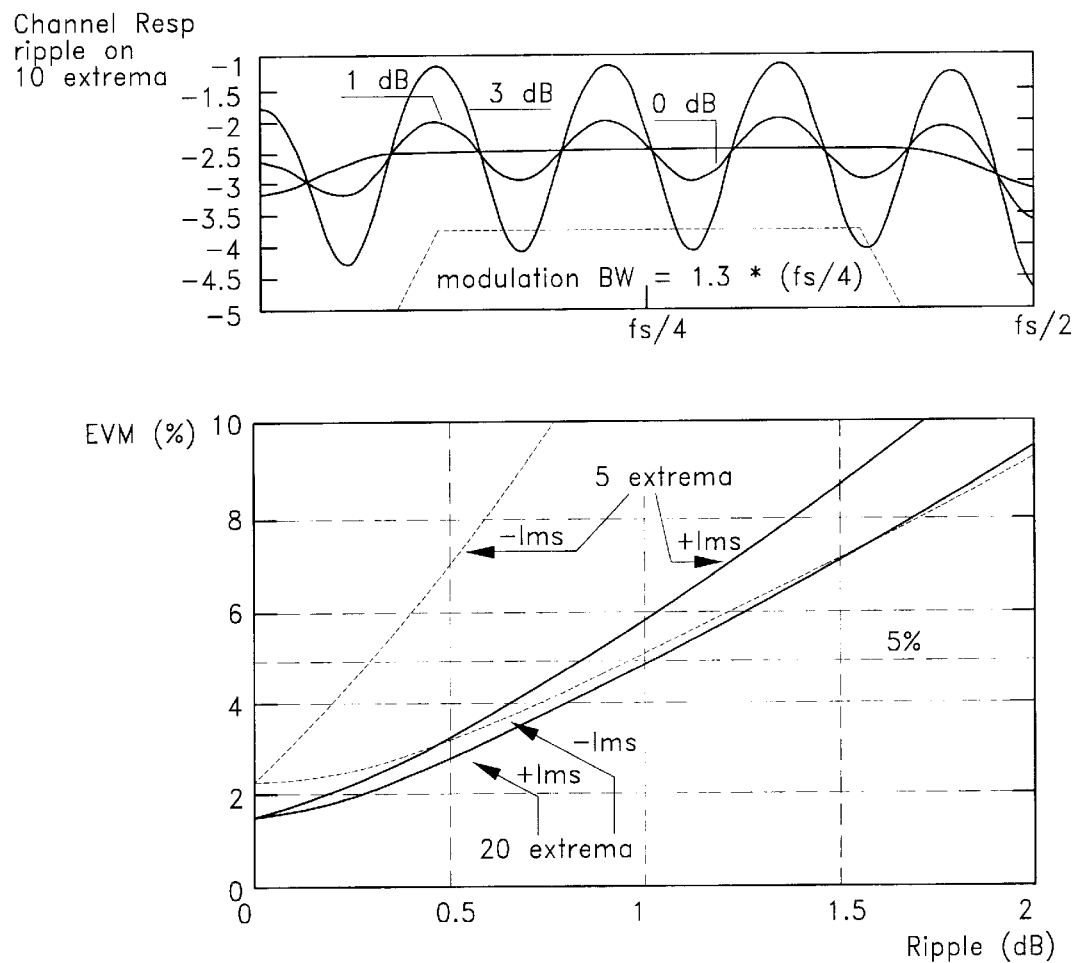
FIG. 27 shows an amplitude distortion performance.

These are mostly caused by impedance mismatches in the network, which result in signal reflections. In turn, these result in amplitude variations of the channel response, commonly called amplitude 'ripple'. The results of a trial experiment are shown in FIG. 27. A model of the distortion is shown in the upper part of the figure. Three different channel profiles are shown. Each of them has a certain amount of ripple on them. In this example, the profile has 10 extreme (minima or maxima).

Below, the modem performance is shown for an amplitude profile with 5 extreme, and one with 20 extreme. In both cases the LMS block was enabled and disabled, in order to see the performance difference as a function of amplitude ripples.

The architecture with LMS is suited to counter ripple amplitude distortion, though the compensation power is limited. However, this property is limiting for all modems working by equalizer techniques, as will be shown next.

Figure 28:
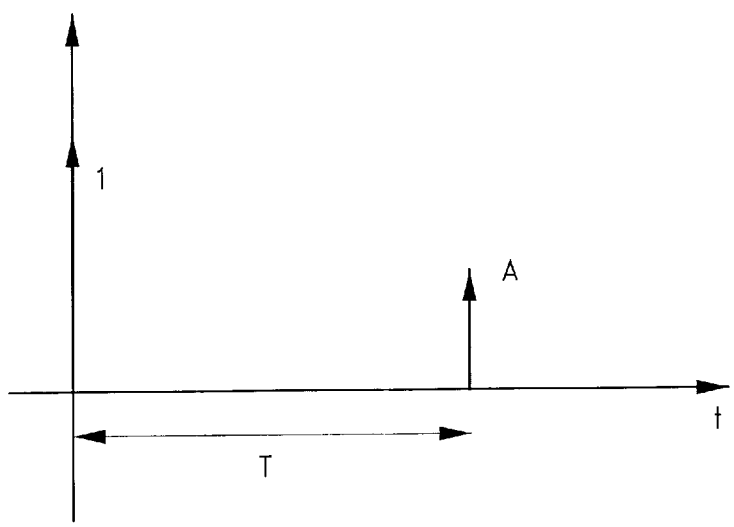
FIG. 28 shows an amplitude ripple model.
Figure 28:
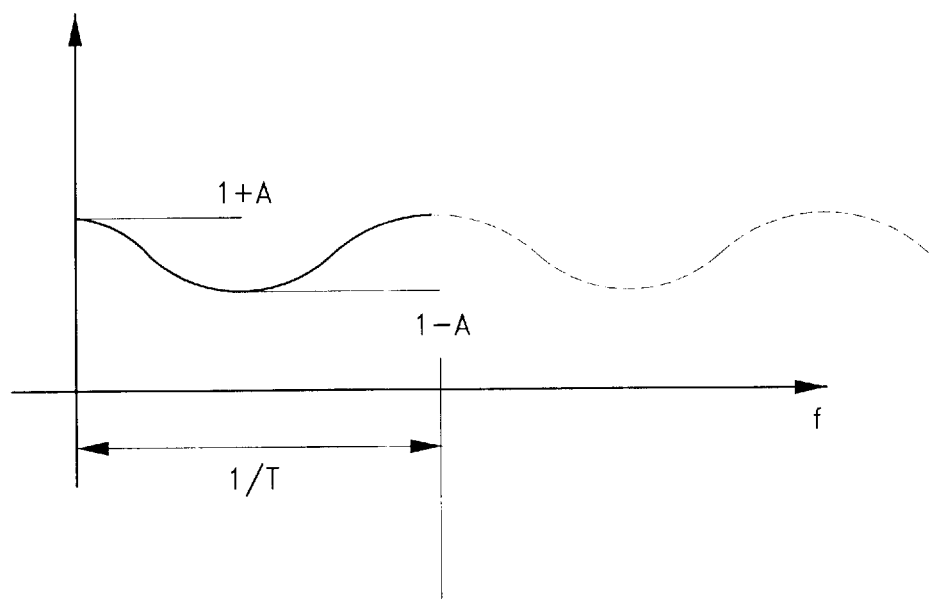

Consider the ripple model of FIG. 28. The upper part shows the time domain response, while the lower part shows the frequency domain response.

A simple rule of thumb can now be derived by considering the relation of the frequency domain peak-to-peak ripple distance and the time domain echo separation. A 1 MHz peak-to-peak ripple distance thus corresponds to an echo 1 microsecond after/before the main time domain shape.

Using this rule of thumb, we can now count the number of amplitude ripples in the modulated band to arrive at an estimate of the required number of taps for a symbol spaced equalizer (such as found in the LMS block). 20 ripples inside of the signal modulation bandwidth correspond to an echo that extends over 20 symbol period. Thus, at least 20 taps are needed in the equalizer to remove the ISI induced by this echo.

The following is concluded: The more amplitude ripples in the modulation bandwidth, the more taps required for the equalizer that provides compensation. On the other hand, a longer equalizer adapts more slowly, and thus makes tracking more difficult. For this reason the equalizer in the proposed architecture is deliberately chosen short.

What is claimed is:

1. A telecommunication system with an upstream communication system for communication from a user to a head-end over a channel, said upstream communication system comprising a head-end receiver, said head-end receiver comprising a detect unit configured in a feed-forward data-driven architecture, said detect unit comprising an information extraction module, said information extraction module comprising a fractionally spaced feed-forward equalizer, wherein:

said detect unit is adapted to receive a burst-mode signal comprising a preamble and a user message;

said information extraction module is configured to extract from said preamble information on at least one transmission characteristic of said burst-mode signal in said channel; and coefficients of said fractionally spaced feed-forward equalizer are programmed using said information.

2. The system as recited in claim 1, wherein said preamble comprise at least one training portion and at least one timing alignment portion, and wherein said training portion is positioned at a beginning of said burst-mode signal.

3. The system as recited in claim 2, wherein said receiver further comprises a timing module wherein said timing alignment portion is processed, said timing alignment portion providing the transition from said training portion to said user message as a down-sampling phase of said timing module.

4. The system as recited in claim 3, wherein said at least one timing alignment portion has a predefined shape different from that of said at least one training portion, and wherein said timing module is configured to detect and separate said predefined shape from said preamble.

5. The system as recited in claim 4, wherein said timing module further comprises a correlator configured to correlate said burst-mode signal with another signal having a data pattern which is substantially identical to said timing portion.

6. The system as recited in claim 1, wherein said detect unit is further configured to adjust a power level of said burst-mode signal to a predetermined power level, and wherein said fractionally spaced feed-forward equalizer is used to filter said user message.

7. The system as recited in claim 6, further comprising a downsampling module configured to downsample said burst-mode signal from a pass-band signal to a baseband signal.

8. The system as recited in claim 1, wherein said information is extracted and said coefficients are programmed in real time.

9. The system as recited in claim 8, wherein said receiver further comprises a compensator module configured to analyze said user message and compensate for drift effects.

10. The system as recited in claim 6, wherein said detect unit is further configured to detect said burst-mode signal as a power level increase over a preset power level.

11. The system recited in claim 1, wherein said information extraction module extracts an estimate of the channel impulse response from said training portion and said coefficients being obtained by inverting said estimate.

12. The system as recited in claim 1, wherein said extraction module has a feed forward architecture.

13. A telecommunication system with an upstream communication system for communication from a user to a head-end over a channel, said upstream communication system having a head-end receiver comprising a detect unit configured in a feed-forward data-driven architecture, wherein said detect unit is adapted to receive a burst-mode signal having a preamble with at least one training portion, at least one timing alignment portion and a user message, wherein said at least one training portion is positioned at a beginning of a communication burst and is followed by said at least one timing alignment portion, said upstream communication system having a transmitter for said user message that is a first sequence of data, said transmitter comprising a preamble insertion unit configured to insert a predetermined sequence of data to said first sequence of data, said predetermined sequence having said training portion at the beginning of the predetermined sequence followed by said timing alignment portion, wherein said receiver comprises a detection module configured to detect said signal and adjust a power level of said signal to a predetermined power level, and a filter module with programmable coefficients to filter said user message, wherein said filter module comprises:

a delay line for said signal with a number of samples being at least N+2, N being the number of said programmable coefficients;

a differentiator for data samples of said training portion coupled to a rotator configured to rotate the differentiated data samples, said rotator coupled to a scaler for data samples resulting from said rotator, said differentiator, said rotator and said scaler being configured as a set of adder, subtractor and shift components;

a storage unit configured to store said resulting data samples of said training portion as said programmable coefficients;

a convolutor configured to filter the resulting data samples of said training portion during reception of said user message; and a correlator configured to provide signal alignment, said correlator using a signal pattern being essentially identical to said timing alignment portion.

14. A telecommunication system with an upstream communication system for communication from a user to a head-end over a channel, said upstream communication system comprising a head-end receiver, said head-end receiver comprising a detect unit configured in a feed-forward data-driven architecture, said detect unit comprising an information extraction module, said information extraction module comprising a fractionally spaced feed-forward equalizer, wherein:

said detect unit is adapted to receive a burst-mode signal comprising a preamble and a user message;

said preamble comprise at least one training portion and at least one timing alignment portion;

said training portion is positioned at a beginning of said burst-mode signal;

said training portion is followed by said at least one timing alignment portion;

said feed-forward data-driven architecture is implemented as a chain of components;

said burst-mode signal being consecutively passed without feedback through said chain;

said chain comprising components having finite state machines and datapaths;

said burst-mode signal being passed through said datapaths;

said finite state machines operating a control module; and said components operating differently when a signal is received than when not.

15. The system as recited in claim 14, wherein said detect unit is further configured to adjust a power level of said burst-mode signal to a predetermined power level, said system further comprising a filter module with programmable coefficients, said filter module configured to filter said user message, said coefficients being extracted from said preamble in real time.

16. The system as recited in claim 15, wherein said receiver further comprises a compensator module configured to analyze said user message and compensate for drift effects and to adapt said receiver to said channel.

17. The system as recited in claim 14, wherein said system is a single chip being fabricated using CMOS technology.

18. In a communications system, a method for transmitting a signal, said method comprising the steps of:

transforming said signal into a first sequence of data;

prepending a predetermined sequence of data to said first sequence of data, said predetermined sequence having a training portion at the beginning of the predetermined sequence followed by a timing alignment portion, the combination of said predetermined sequence and said first sequence being a resulting data sequence; and modulating said resulting data sequence to a predetermined format for transmission;

receiving said signal in a receiver with an equalizer module with programmable coefficients, said receiving step further comprising the steps of:

fixing said coefficients while only analyzing said training portion of said predetermined sequence of first data;

detecting said timing alignment portion as the transition to said first sequence of data; and performing data filtering on said first sequence of data.

19. The method as recited in claim 18, wherein said steps are executed in real-time.

20. The method recited in claim 18, wherein said analyzing step is based on matched filter receiver techniques exploiting only a matched waveform included in said predetermined sequence.

21. A method of operating an adaptive modem for analyzing signals being transmitted over a communications channel, said signals being sent in at least one burst comprising a preamble and a user message, said method comprising the steps of:

receiving the transmitted signals;

generating a plurality of coefficients for a downsampling feed forward adaptive equalizer from only a training sequence in said preamble of said burst; and adapting said downsampling feed forward adaptive equalizer to said communications channel.

22. The method as recited in claim 21, wherein the signals are analyzed on a burst-by-burst basis in real-time.

23. The method recited in claim 21, wherein said generating step is based on matched filter receiver techniques exploiting only a matched waveform included in said preamble.

24. A receiver for use in a telecommunication system, said telecommunication system having an upstream transmitter and a communication channel coupled to the receiver, said upstream transmitter configured to prepend a preamble to a user data sequence to form a signal for transmission over said communication channel, said preamble having at least a training portion and a timing alignment portion, said receiver comprising:

a detection unit configured to receive said signal from said communication channel; wherein said signal is a burst-mode signal, said detection unit comprising an information extraction module configured to extract only information on at least one transmission characteristic of said burst-mode signal in said channel, said information being obtained as coefficients of a fractionally spaced feed-forward equalizer in said module; and a timing module responsive to said alignment portion to locate a transition to said user data message.

25. The receiver of claim 24, wherein said timing module comprises a correlator adapted to correlate said said signal with a prestored signal having a data pattern being substantially identical to said timing alignment portion.

26. The receiver of claim 24, said receiver further comprising a separator configured to separate said training portion and said timing alignment portion.

27. The receiver of claim 26, wherein said separator comprises a correlator configured to correlate said signal with another signal having a data pattern being substantially identical to said timing alignment portion.

28. The receiver of claim 24, wherein said detection unit has a power adjustment module which adjusts the power level of said signal to a predetermined power level.

29. The receiver of claim 28, wherein said detection unit further comprises a filter module with programmable coefficients to filter said signal.

30. The receiver of claim 24, said signal having a user data sequence, said receiver further comprising a compensator module configured to compensate for drift effects during analysis of said user data sequence.

31. A telecommunication system with an upstream communication system for communication from a user to a head-end over a channel, said upstream communication system having a head-end receiver comprising a detect unit adapted to receive a burst-mode signal having a preamble with at least one training portion and at least one timing alignment portion, said upstream communication system having a transmitter for said user message that is a first sequence of data said transmitter comprising a preamble insertion unit configured to insert a predetermined sequence of data to said first sequence of data, said predetermined sequence having said training portion at a beginning of the predetermined sequence followed by said timing alignment portion, wherein said receiver comprises a detection module configured to detect said signal and adjust a power level of said signal to a predetermined power level, and a filter module with programmable coefficients to filter said user message, wherein said filter module comprises:

a delay line for said signal with a number of samples being at least N+2, N being the number of said programmable coefficients;

a differentiator for data samples of said training portion coupled to a rotator configured to rotate the differentiated data samples, said rotator coupled to a scaler for data samples resulting from said rotator, said differentiator, said rotator and said scaler being configured as a set of adder, subtractor and shift components;

a storage unit configured to store said resulting data samples of said training portion as said programmable coefficients;

a convolutor configured to filter the resulting data samples of said training portion during reception of said user message; and a correlator configured to provide signal alignment, said correlator using a signal pattern being essentially identical to said timing alignment portion.

32. In a communication system, a method for transmitting a signal, said method comprising the steps of:

transforming said signal into a first sequence of data;

prepending a predetermined sequence of data to said first sequence of data, said predetermined sequence having a training portion at a beginning of the predetermined sequence followed by a timing alignment portion, a combination of said predetermined sequence and said first sequence being a resulting data sequence;

modulating said resulting data sequence to a predetermined format for transmission; and receiving said signal in a receiver with an equalizer module with programmable coefficients, said receiving step further comprising the steps of:

fixing said programmable coefficients while analyzing said training portion in a feed-forward manner;

detecting said timing alignment portion as a transition to said first sequence of data; and performing data filtering on said first sequence of data.

33. A method of operating an adaptive modem for analyzing signals being transmitted over a communications channel, said signals being sent in at least one burst comprising a preamble and a user message, said method comprising the steps of:

receiving the transmitted signals;

generating the plurality of coefficients for a downsampling equalizer with a feed-forward architecture from a training sequence in said preamble of said burst; and adapting said downsampling adaptive equalizer to said communications channel.

34. A receiver for use in a telecommunications system, said telecommunications system having an upstream transmitter and a communication channel coupled to the receiver, said upstream transmitter configured to prepend a preamble to a user data sequence to form a signal for transmission over said communication channel, said preamble having at least a training portion and a timing alignment portion, said receiver comprising:

a detection unit configured to receive said signal from said communication channel, wherein said signal is a burst mode signal, said detection unit comprising an information extraction module using a feed-forward architecture, configured to extract information on at least one transmission characteristic of said burst-mode signal in said channel, said information being obtained as coefficients of a fractionally spaced feed-forward equalizer in said module; and a timing module responsive to said alignment portion to locate a transmission to said user data message.

35. A telecommunication system with an upstream communication system for communication from a user to a head-end over a channel, said upstream communication system having a head-end receiver comprising a detect unit configured in a feed-forward data-driven architecture, wherein said detect unit is adapted to receive a burst-mode signal having a preamble with at least one training portion and at least one timing alignment portion, and wherein said detect unit comprises an information extraction module configured to extract from said training portion at least one channel characteristic, said information extraction module having a feed forward architecture.

36. A telecommunication system with an upstream communication system for communication from a user to a head-end over a channel, said upstream communication system having a head-end receiver comprising a detect unit configured in a feed-forward data-driven architecture, wherein said detect unit is adapted to receive a single burst-mode signal, said single burst-mode signal having a preamble with at least one training portion and at least one timing alignment portion, wherein said at least one training portion is positioned at a beginning of said burst-mode signal and is followed by said at least one timing alignment portion, wherein said single burst-mode signal further comprises a user message being a first sequence of data, said upstream communication system further having a transmitter for said user message, said transmitter comprising a preamble insertion unit configured to insert a predetermined sequence of data to said first sequence of data, said predetermined sequence having said training portion at a beginning of the predetermined sequence followed by said at least one timing alignment portion, wherein said detect unit comprises an information extraction module configured to extract information on at least one transmission characteristic of said single burst-mode signal in said channel, said information being obtained as coefficients of a fractionally spaced feed-forward equalizer in said information extraction module, wherein said fractionally spaced feed-forward equalizer is configured with said coefficients to filter said user message.

37. A telecommunication system with an upstream communication system for communication from a user to a head-end over a channel, said upstream communication system for communication from a user to a head-end over a channel, said upstream communication system having a head-end receiver comprising a detect unit configured in a feed-forward data-driven architecture, wherein said detect unit is adapted to receive a burst-mode signal having a preamble with at least one training portion, at least one timing alignment portion and a user message, wherein said at least one training portion is positioned at a beginning of a communication burst and is followed by said at least one timing alignment portion, said upstream communication system having a transmitter for said user message that is a first sequence of data, said transmitter comprising a preamble insertion unit configured to insert a predetermined sequence of data to said first sequence of data, said predetermined sequence having said training portion at the beginning of the predetermined sequence followed by said timing alignment portion, wherein said receiver comprises a detection module configured to detect said signal and adjust a power level of said signal to a predetermined power level, and a filter module with programmable coefficients to filter said user message, wherein said filter module comprises:

a differentiator coupled to a rotator configured to rotate differentiated data samples, said rotator coupled to a scaler for data samples resulting from said rotator; and a storage unit configured to store said resulting data samples as said programmable coefficients.

38. The system of claim 37, wherein said filter module further comprises a delay line for said signal with a number of samples being at least N+2, N being the number of said programmable coefficients.

39. The system of claim 37, wherein said filter module further comprises a convolutor configured to filter the resulting data samples of said training portion during reception of said user message.

40. The system of claim 37, wherein said filter module further comprises a correlator configured to provide the signal alignment, said correlator using a signal pattern being essentially identical to said timing alignment portion.

41. The system of claim 37, wherein said differentiator, said rotator and said scaler are configured as a set of adder, subtractor and shift components.

42. A telecommunication system with an upstream communication system for communication from a user to a head-end over a channel, said upstream communication system having a head-end receiver comprising a detect unit adapted to receive a burst-mode signal having a preamble with at least one training portion and at least one timing alignment portion, said upstream communication system having a transmitter for said user message that is a first sequence of data, said transmitter comprising a preamble insertion unit configured to insert a predetermined sequence of data to said first sequence of data, said predetermined sequence having said training portion at a beginning of the predetermined sequence followed by said timing alignment portion, wherein said receiver comprises a detection module configured to detect said signal and adjust a power level of said signal to a predetermined power level, and a filter module with programmable coefficients to filter said user message wherein said filter module comprises:

a differentiator coupled to a rotator configured to rotate differentiated data samples, said rotator coupled to a scaler for data samples resulting from said rotator; and a storage unit configured to store said resulting data samples as said programmable coefficients.

43. The system of claim 42, wherein said filter module further comprises a delay line for said signal with a number of samples being at least N+2, N being the number of said programmable coefficients.

44. The system of claim 42, wherein said filter module further comprises a convolutor configured to filter the resulting data samples of said training portion during reception of said user message.

45. The system of claim 42, wherein said filter module further comprises a correlator configured to provide the signal alignment, said correlator using a signal pattern being essentially identical to said timing alignment portion.

46. The system of claim 42, wherein said differentiator, said rotator and said scaler are configured as a set of adder, subtractor and shift components.

47. A telecommunication system with an upstream communication system for communication from a user to head-end over a channel, said upstream communication system having a head-end receiver comprising a detect unit, said detect unit adapted to receive a single burst-mode signal having a preamble with at least one training portion and at least one timing alignment portion, wherein said detect unit comprises an information extraction module configured to extract information on at least one transmission characteristic of said single burst-mode signal in said channel, said information being obtained as coefficients of a fractionally spaced feed-forward equalizer in said module, wherein said upstream communication system has a transmitter for said user message, said user message being a first sequence of data, said transmitter comprising a preamble insertion unit configured to insert a predetermined sequence of data to said first sequence of data, said predetermined sequence having said training portion at a beginning of the predetermined sequence followed by said timing alignment portion.

48. The telecommunication system as recited in claim 47, wherein the information extraction module has a feed-forward architecture.

49. The system as recited in claim 47, wherein said information extraction module extracts an estimate of a channel impulse response from said training portion and said coefficients being obtained by inverting said estimate.

50. A method of operating an adaptive modem for analyzing signals being transmitted over a communications channel, said signals being sent in a burst comprising a preamble and a user message, said method comprising the steps of:

receiving the transmitted signals;

generating a plurality of coefficients for a downsampling feed forward adaptive equalizer from only a training sequence in said preamble of said burst; and adapting said downsampling feed forward adaptive equalizer to said communications channel.

51. A telecommunication system comprising:

a transmitter adapted to transmit a signal, said transmitter comprising a preamble insertion unit configured to insert a predetermined sequence of data into said signal, said predetermined sequence having a timing alignment portion; and a receiver adapted to receiver said signal, said receiver comprising a correlator module configured to provide signal alignment, wherein said correlator module uses a signal pattern being essentially identical to said timing alignment portion.

52. A telecommunication system comprising:

a transmitter adapted to transmit a signal, said transmitter comprising a preamble insertion unit configured to insert a predetermined sequence of data into said signal, said predetermined sequence having a training portion, said training portion reflecting at least one transmission characteristic of a channel in said telecommunication system; and a receiver adapted to receive said signal, said receiver comprising a fractionally spaced feed-forward equalizer, wherein said receiver extracts said at least one transmission characteristic of said channel from said training portion and programs coefficients of said fractionally spaced feed-forward equalizer.

53. A method of operating an adaptive modem for analyzing a signal being transmitted over a communications channel, said method comprising:

inserting a predetermined sequence of data having a timing alignment portion into said signal;

transmitting said signal;

receiving said signal;

correlating said timing alignment portion with a signal pattern that is essentially identical to said timing alignment portion; and performing signal alignment on said signal.

54. A method of operating an adaptive modem for analyzing a signal being transmitted over a communications channel, said method comprising:

inserting a predetermined sequence of data having a training portion into said signal, wherein said training portion reflects at least one transmission characteristic of said communications channel;

transmitting said signal;

receiving said signal;

extracting said at least one transmission characteristic from said training portion; and determining coefficients of a fractionally spaced feed-forward equalizer from said at least one transmission characteristic.

* * * * *